(12) United States Patent
Georgiev

(10) Patent No.: US 7,433,898 B1
(45) Date of Patent: Oct. 7, 2008

(54) METHODS AND APPARATUS FOR SHARED STORAGE JOURNALING

(75) Inventor: Ivan I. Georgiev, Sofia (BG)

(73) Assignee: Sanbolic, Inc., Watertown, MA (US)

( * ) Notice: Subject to any disclaimer, the term of this patent is extended or adjusted under 35 U.S.C. 154(b) by 371 days.

(21) Appl. No.: 11/115,041

(22) Filed: Apr. 26, 2005

Related U.S. Application Data

(60) Provisional application No. 60/576,082, filed on Jun. 1, 2004.

(51) Int. Cl.
*G06F 12/00* (2006.01)

(52) U.S. Cl. .......................... 707/202; 707/9; 707/201; 711/163; 714/2; 714/15; 726/27

(58) Field of Classification Search ............. 707/9, 707/201, 202; 711/163; 726/27; 714/2, 714/15
See application file for complete search history.

(56) References Cited

U.S. PATENT DOCUMENTS

| | | | | |
|---|---|---|---|---|
| 5,214,780 A | * | 5/1993 | Ingoglia et al. | 718/106 |
| 5,706,509 A | * | 1/1998 | Man-Hak Tso | 707/201 |
| 5,931,955 A | * | 8/1999 | Kung | 714/15 |
| 6,910,100 B2 | * | 6/2005 | Lewalski-Brechter | 711/114 |
| 7,139,927 B2 | * | 11/2006 | Park et al. | 714/4 |
| 2001/0014948 A1 | * | 8/2001 | Ooki et al. | 713/201 |
| 2003/0097381 A1 | * | 5/2003 | Detweiler et al. | 707/201 |
| 2005/0015416 A1 | * | 1/2005 | Yamagami | 707/204 |
| 2005/0033777 A1 | * | 2/2005 | Moraes et al. | 707/202 |
| 2005/0235016 A1 | * | 10/2005 | Amano et al. | 707/204 |

* cited by examiner

*Primary Examiner*—Shahid A. Alam
*Assistant Examiner*—Phong Nguyen
(74) *Attorney, Agent, or Firm*—Chapin IP Law, LLC; Paul P. Kriz, Esq.

(57) ABSTRACT

Multiple computers have access to a shared storage system. The computers negotiate with each other for access rights (e.g., READ or WRITE) to regions of the storage system. After negotiating for permission to modify a location (e.g., a range of addresses) of the shared storage system, a given computer copies data from the shared storage system into its own corresponding cache. The given computer granted the permission then modifies the data in its cache while maintaining a separate journal of corresponding changes to metadata. The given computer writes the journal to a dedicated region of the storage system. Thereafter, the given computer attempts to flush contents of the modified cache to the storage system. If the given computer crashes while attempting to flush the modified cache to the shared storage system, a healthy one of the multiple computers utilizes the journal information in the storage system to recover metadata.

23 Claims, 13 Drawing Sheets

METHODS AND APPARATUS FOR SHARED STORAGE JOURNALING

RELATED APPLICATIONS

This application claims the benefit of U.S. Provisional Application No. 60/576,082 entitled "METHODS AND APPARATUS SUPPORTING SHARED USE OF STORAGE," filed on Jun. 1, 2004, the entire teachings of which are incorporated herein by this reference. This application is also related to:

i) co-pending U.S. patent application Ser. No. 11/114,905 entitled "METHODS AND APPARATUS FACILITATING ACCESS TO SHARED STORAGE AMONG MULTIPLE COMPUTERS," describing functionality associated with transaction management, ii) co-pending U.S. patent application Ser. No. 11/114,943 entitled "METHODS AND APPARATUS FACILITATING VOLUME MANAGEMENT," describing functionality associated with volume management, iii) co-pending U.S. patent application Ser. No. 11/114,913 entitled "METHODS AND APPARATUS FACILITATING ACCESS TO SHARED STORAGE AMONG MULTIPLE COMPUTERS," describing functionality associated with cluster management, iv) co-pending U.S. patent application Ser. No. 11/115,098 entitled "METHODS AND APPARATUS FACILITATING ACCESS TO STORAGE AMONG MULTIPLE COMPUTERS," describing functionality associated with operation locks among computers in a cluster, all of which have been filed on the same date as the present application, the entire teachings of which are also incorporated herein by this reference.

BACKGROUND

Computer systems typically include one or more processors that support access to an externally attached storage device such as a shared storage system. According to certain conventional applications, multiple computers may couple to the shared storage system via a network connection or dedicated high-speed communication link. Two or more of the computers may be afforded access to the same files stored in the shared storage system.

To prevent corruption of files in the shared storage system, conventional applications typically employ some means for preventing two or more users from modifying the same file at the same time. Otherwise, two or more computers having shared access to a file in the shared storage system may simultaneously access and modify the same file without accounting for each other's action.

Most shared storage applications utilize a file system to keep track of data accessible by each of the users. In general, a file system is the overall structure in which computer files are named, stored and organized. Typical file systems consist of files, directories, and information (e.g., metadata) needed to locate and access the files in the file system. Thus, file systems in general provide logical organization for user data stored in a shared storage system.

In order to maintain the logical organization, the file system keeps track of metadata for its own purposes. The metadata describes the internal organization of the file system. For example, metadata may identify free space size and location of free space blocks within the underlying storage media of the shared storage system as well as a tree-like structure of user directories of the shared storage system. Additionally, metadata associated with each file may include information such as i) file size, name and attributes, ii) a location and size of the blocks allocated by the file, iii) security access information, etc. Thus, properly maintained metadata associated with the shared storage system is important for accessing corresponding data.

SUMMARY

Conventional computer applications that support shared access to files in a storage system suffer from a number of deficiencies. For example, conventional shared storage applications are susceptible to computer crashes such as those caused by power failures, hardware failures, software bugs, etc. In the event a computer having access to the shared storage system crashes during a WRITE operation (e.g., a WRITE of metadata to the storage system), an entire file system associated with the shared storage may become corrupted and, therefore, rendered unusable. If this happens, none of the healthy computers as well as the crashed computer would be able to access the data in the shared storage system.

Conventional computer applications that support journaling do not lend themselves to applications in which multiple computers have access to a shared storage system. For a computer system to be reliable, the computer system must be able to restore the shared storage system to a consistent state after a crash or power failure. Consistency of the metadata before and after a crash is essential for ensuring future access and the proper operation of a file system. If for some reason the metadata becomes corrupted, corresponding user data will also be corrupted resulting in an unusable file system. In other words, an entire file system may be destroyed if a computer accessing the shared storage happens to crash during a WRITE metadata operation. To prevent this and other types of corruption, embodiments of the invention involve a technique of updating metadata during processes of creating, deleting or modifying user files in the shared storage system.

Typically, modifications to metadata require modifications to multiple blocks of the storage. In most cases these multiple storage access operations must complete in a group to maintain consistency. However the storage device cannot guarantee that in case of a system crash or a power failure. Thus, there exists a need for the ability to restore metadata after a crash.

To prevent corruption or general loss of modified data in the shared storage system as a result of a computer crash, embodiments of the invention involve maintaining a journal in the shared storage system. The journal includes a record (or records) of transactions (e.g., modification operations performed on metadata) that occur in the computer prior to a crash. In the event of a computer crash, the journal in the shared storage system may be retrieved and used to reconstruct events or sets of data that have been lost or damaged. Use of journaling in this way provides at least some assurance that stored journal information can be used to restore a shared storage system to a usable state.

Embodiments of the invention significantly overcome the aforementioned and other deficiencies of conventional network management applications. In particular, and as briefly mentioned, embodiments of the invention include mechanisms and techniques for ensuring integrity of metadata associated with a distributed, shared file system. Certain embodiments of the invention include software incorporating the functionality explained herein. Other embodiments include computerized devices configured to operate as explained herein.

In a specific embodiment of the invention, multiple computers (e.g., a cluster of computers) have access to a common volume in a shared storage system. The computers negotiate with each other over a network for access rights (e.g., READ or WRITE) to areas of the volume. After negotiating for permission to modify a location (e.g., a range of addresses) of the volume, a given computer copies data from the shared storage system into its own corresponding cache. The given computer granted the permission then modifies the data in its cache while maintaining a separate journal in its cache of corresponding operations associated with the changes to metadata. When the given computer fills the journal to capacity or receives an indication to flush the metadata to shared storage, the given computer writes the journal to a dedicated region of the storage system. Thereafter, the given computer attempts to flush contents of the modified cache of metadata to the storage system. If the given computer crashes while attempting to flush the modified cache to the shared storage system, a healthy one of the multiple computers utilizes the journal stored in the shared storage system to recover the metadata. Consequently, integrity of a distributed file system among the multiple computers may be kept intact despite the crash.

More general embodiments of the invention include techniques of supporting enhanced integrity of data in a storage system accessible by multiple computers. For example, in one general embodiment, a processor (e.g., one or multiple processor devices running a software programs in a first computer) detects a change to file system metadata stored in the first computer, which is one of multiple computers having access to the shared storage system. In response to detecting the change to the file system metadata in the first computer, the processor locally creates a journal. The journal identifies operational steps associated with the change to the file system metadata. At some point during operation, the processor initiates storage of the journal to the shared storage system. The journal stored in the shared storage system can be replayed or executed to reproduce the change associated with the file system metadata. Thus, in the event that the change is lost due to a computer crash, the change can be reproduced.

In further embodiments and potentially other independent embodiments of the invention, the processor (e.g., first computer) negotiates with the multiple computers for access rights to a specific region of the shared storage system. After successful negotiation, the processor retrieves the file system metadata from the specific region of the shared storage system. The processor then stores the retrieved file system metadata (or other type of data retrieved from the shared storage system) in a cache of the first computer. Accordingly, based on use of the first computer, a user may access a file or portion of a file in the shared storage and modify its contents.

As a result of further processing, the processor (potentially in response to user input) initiates a change to the retrieved file system metadata stored in the cache of the first computer. The processor detects a change to the file system metadata stored in the cache of the first computer and creates a corresponding journal. The journal identifies operational steps associated with making the change to the file system metadata in the cache. For example, the processor generates a journal entry for the journal. The journal entry includes a set of executable operational steps that may be performed by a computer to recreate the change to the file system metadata in the first computer. In one embodiment, the operational steps associated with a particular journal entry are i) atomic and ii) idempotent.

In addition to storing the operational steps describing the change to data in the cache, the processor generates time stamps for corresponding journal entries stored in the journal. The time stamps indicate a relative time when the first computer makes a corresponding change to the file system metadata in the first computer. In general, the time stamps may be used at a later time to aid in reconstruction of the file system metadata in the shared storage system in the event that the first computer experiences a crash.

In one embodiment, the first computer maintains access right data (e.g., operation locks data) identifying which of the multiple computers has (or had) exclusive or shared access to different regions of the shared storage at different times. The processor in the first computer stores at least a portion of the access right information to the journal along with the operational steps as mentioned. During reconstruction or replay of the journal, the access right information may be used to identify which operations in the journal need to be replayed.

According to one embodiment, when contents of the journal exceeds a threshold, the processor stores or flushes the contents of the journal to a specific journal data region in the shared storage system allocated for use by the first compute to store the journal. According to another embodiment, the cache of the journal can be flushed to storage periodically, randomly, or at any given time based on a triggering event.

In one embodiment, it is possible to disable caching of the journal, so that any modifications are written directly to a portion of the shared storage system instead of a separately located journal cache. In such an application, there is a specific order of writing the journal and the metadata. For example, journal entries are written to the shared storage system before the corresponding metadata changes are written to the shared storage system. Thus, if a machine needs to flush metadata in its cache, e.g., because some other machine requests access over the same portion of the storage system, the first machine writes to the corresponding journal entry first.

Different journal data regions of the shared storage system can be allocated for use by other computers to store their corresponding journals. Thus, one portion of the shared storage system may be allocated for storing journal data while another portion of the shared storage system can be allocated for storing application data, metadata, etc.

After successfully flushing contents of the journal to the shared storage system, the processor in the first computer processor initiates storage of the file system metadata in the cache, including any modifications (e.g., the change), to the shared storage system. Thus, in order to flush contents of the metadata cache including any modifications, the first computer first stores the journal to the shared storage device and then proceeds to flush the modified data in cache to the shared storage system. Replaying the journal of the first computer can be useful when the first computer experiences a crash when attempting flush contents of the cache to the shared storage device.

One embodiment of the invention involves maintaining respective journals associated with each of the multiple computers having access to the shared storage system. The respective journals include journal entries identifying operational steps associated with changes initiated by the multiple computers to different regions of the shared storage at different times. In the event that one of multiple computers competing for access to the shared storage system detects a failure associated with, for example, a given computer, the computer detecting the failure may utilize the journal of the first computer stored in the shared storage system as well as at least one of the respective journals of a non-failing computer. For example, a remaining one or more healthy computers generates a map identifying which non-overlapping regions (ranges of locations) in the shared storage system need to be modified by replaying portions of the journal associated with the failed computer.

As discussed, a healthy computer (e.g., a non-failing computer) may detect a failure in a computer having access to the shared storage system. The failure can be detected as a result of at least one of: a.) failing to receive a heartbeat signal from the computer, b.) receiving a message from another non-failing computer that the computer experiences the failure, and c.) attempting to communicate with the computer but failing to receive an acknowledgment message as well as any other notification method.

In response to detecting the failing computer, the healthy computer in a cluster generates a request to access a journal in the shared storage system associated with the failing computer. As discussed, the journal includes journal entries of modification operations associated with the failing computer prior to the failure. In one embodiment, the failing computer generates the request to access a specific journal data region in the shared storage system allocated for use by the computer to store the journal, other journal data regions of the shared storage system being allocated for use by other computers to store their corresponding journals.

In one embodiment, the healthy computer utilizes the journal to fix corrupted file system metadata in the shared storage system. For example, on behalf of the failing computer, the healthy computer retrieves and replays the journal associated with the computer in the shared storage system. Replaying the journal includes executing a modification operation on a region in a smaller region of the shared storage system than specified in the journal of operations.

According to another application, it is possible that no modifications need to be made during replay at all. This can happen, for example, if a healthy computer currently has exclusive rights over all the regions previously modified by and described in the journal of the failed machine.

As discussed, techniques of the invention are well suited for use in applications in which multiple computers compete for access to similar locations of a shared storage system. However, it should be noted that embodiments of the invention are not limited to use in such applications and thus embodiments of the invention are well suited for other applications as well. For example, techniques of the present invention are not limited to generating and storing journals associated with locally modified metadata retrieved from a shared storage system.

Other embodiments of the invention include a computerized device (e.g., a host computer, workstation, personal computer, processing device, etc.) configured to support the aforementioned method operations disclosed herein as embodiments of the invention to provide journaling in a shared storage system. In such embodiments, the computerized device includes a display, a memory system, a processor (e.g., a processing device) and an interconnect. The interconnect supports communications among the display, the processor and the memory system. The memory system is encoded with a software application that, when executed on the processor, enables each of multiple computers to generate corresponding journals and store them in the shared storage system.

Yet other embodiments of the invention disclosed herein include software programs to perform the method embodiment and operations summarized above and disclosed in detail below under the heading Detailed Description of Preferred Embodiments. More particularly, a computer program product (e.g., a computer-readable medium) including computer program logic encoded thereon may be executed on a computerized device to support other embodiments of the invention as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of storage area network management servers, can also support embodiments of the invention.

One more particular embodiment of the invention is directed to a computer program product that includes a computer readable medium having instructions stored thereon for supporting journaling techniques as discussed herein. The instructions, when carried out by a processor of the first data communication device, cause the processor to perform the steps of: i) detecting a failure in a computer having access to a shared storage system, ii) generating a request to access a journal in the shared storage system associated with the computer in response to detecting the failure, the journal including journal entries of modification operations associated with the computer prior to the failure, and iii) on behalf of the computer, retrieving and replaying the journal associated with the computer in the shared storage system. Other arrangements of embodiments of the invention that are disclosed herein include software programs to perform any combination of the techniques (or portions thereof) summarized above and disclosed in detail below.

Embodiments of the invention provide utility over the prior art. For example, embodiments of the invention support rapid recovery after a failure, reduce a need for complex backup software for the shared storage system, distribute support duties among multiple computers in a cluster, etc.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

In one embodiment of the invention, multiple computers have access to a common volume in a shared storage system. The computers negotiate with each other for access rights (e.g., READ or WRITE) to areas of the common volume in shared storage system. After negotiating for permission to modify a location (e.g., a range of addresses) of the volume, a given computer copies data from the shared storage system into its own corresponding cache. The given computer granted the permission then modifies the data in its cache while maintaining a separate journal in its cache of corresponding changes to metadata associated with a modified file. The given computer receives a trigger signal to write the journal to a dedicated region of the storage system. Thereafter, the given computer attempts to flush contents (e.g., non-journal data such as application data and metadata) of the modified cache to the storage system. If the given computer crashes while attempting to flush the modified cache to the shared storage system, a healthy one of the multiple computers utilizes the journal stored in the storage system associated with the given computer to recover the metadata. Consequently, integrity of a distributed file system among the multiple computers remain intact even though one or more of the computers accessing a corresponding volume experiences a crash.

Figure 1:
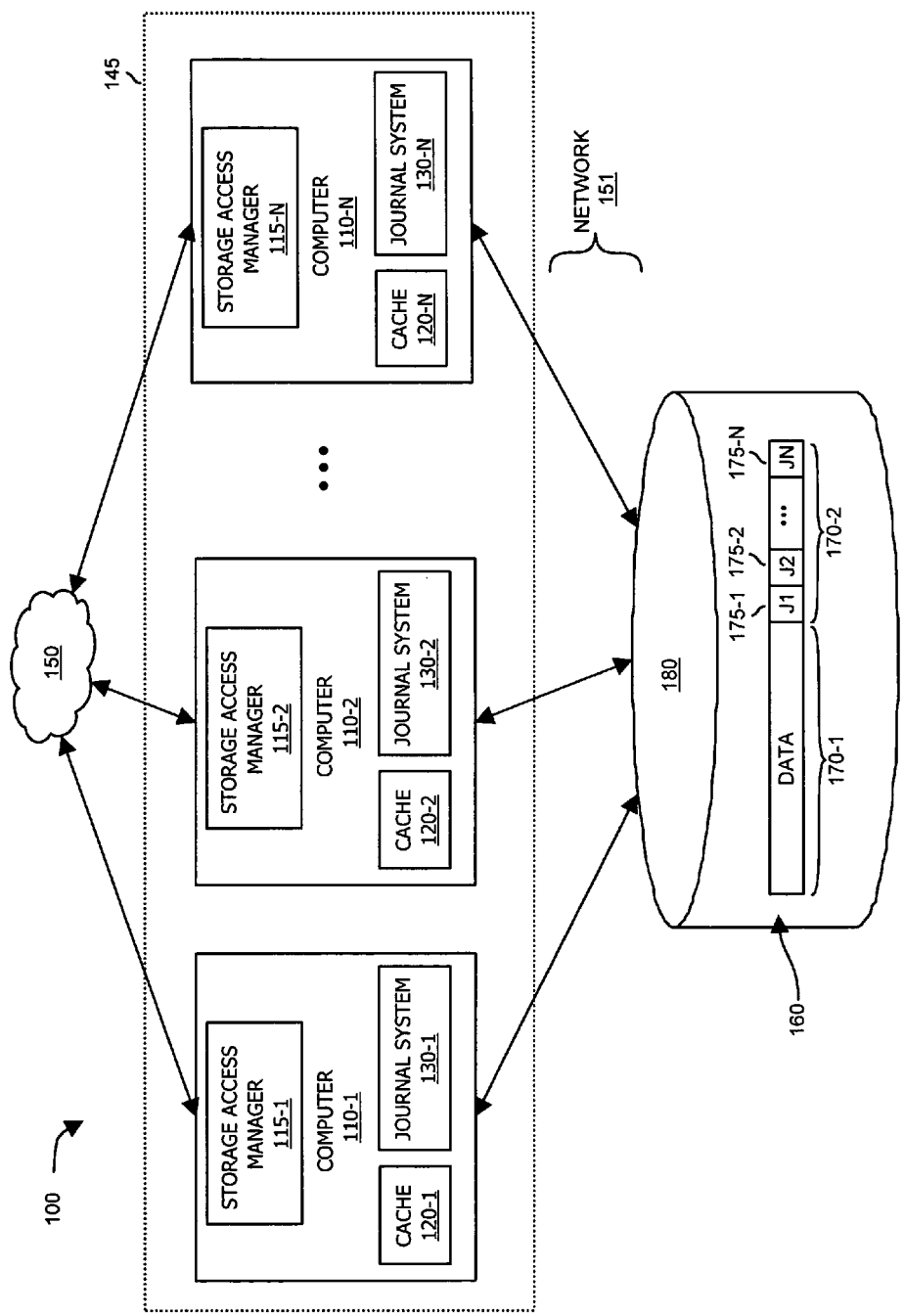
FIG. 1 is a block diagram of multiple computers accessing a shared storage system according to an embodiment of the invention.

FIG. 1 illustrates a system 100 suitable for explaining an operation of example embodiments of the invention. As shown, system 100 includes a network 150, network 151, cluster 145 including computers 110-1, 110-2, . . . 110-n, (collectively, computers 110), and shared storage system 180. Each of the computers 110 includes a respective storage access manager 115-1, 115-2, . . . , 115-n (e.g., a distributed software application), a respective cache 120-1, 120-2, . . . 120-n, and a respective journal system 130-1, 130-2, . . . 130-n. Shared storage system 180 includes storage area 160 for storing user data 170-1 (e.g., metadata and application data) as well as journal data 170-2.

In general, storage access managers 115 of corresponding computers 110 (which form a cluster 145) communicate over network 150 (e.g., a TCP/IP network) to coordinate accesses to a volume in the shared storage system 180. For example, when computer 110-1 desires access to a specific region of a volume in the shared storage system 180, computer 110-1 negotiates with other computers 110-2, . . . , 110-n for access to shared storage system 180. If another computer 110 in the cluster 145 presently has access to the specific region, computer 110-1 waits until it negotiates permission for exclusive access to write to a given volume. Unlike exclusive WRITE access rights, READ access rights need not be exclusive. In other words, multiple computers 110 may simultaneously have rights to READ from specific regions in shared storage system 180.

One method of ensuring exclusive access is to implement an OP-LOCK function (e.g., operation lock function in which one computer has exclusive or shared access) in which other computers 110 in cluster 145 are locked out of accessing the specific storage region in shared storage system 180. Locked out computers 110 do not interfere with computer 110-1 when it has exclusive access to the specific region (e.g., a volume) in the shared storage system 180. Note that at any given time, different computers 110 may negotiate permission to access different portions of shared storage system 180 at the same time. Thus, computer 110-1 may access a specific region in a volume while computer 110-2 has access to a different region of the same volume.

In one embodiment, computers 110 reference locations or regions in the shared storage system 180 based on use of a unified address space. For example, locations in the shared storage system 180 are mapped to a 128-bit address space. Each of computers 110 utilize the same addresses in the unified address space to reference the same locations in shared storage space 180. Thus, computers 110, when negotiating for access to a region in shared storage system, utilize addresses in the unified address space to identify different storage regions.

After negotiating permission to access a specific region in shared storage system 180, computer 110-1 retrieves corresponding data from storage area 160 and stores the retrieved data in cache 120-1. That is, computer 110-1 communicates over network 151 to shared storage system 180. User at computer 110-1 modifies the data in the cache 120-1. As computer 110-1 modifies the data in cache 120-1, respective journal system 130-1 logs the corresponding operations (e.g., transactions) associated with the modifications. In one embodiment, a user modifies aspects of a file in a volume and journal system 130-1 logs changes to metadata associated with the file. Eventually, computer 110-1 flushes the modified data in cache 120-1 back to the shared storage system 180. This involves writing the modified data in cache 120-1 to the storage area 160 of shared storage system 180 and clearing the cache 120-1 for filling again.

In one embodiment, storage area 160 of shared storage system 180 includes dedicated journal data regions 175 for storing journal data associated with respective computers 110. For example, computer 110-1 (when appropriate) writes its journal data from journal system 130-1 to journal data region 175-1, computer 110-2 (when appropriate) writes its journal data from journal system 130-2 to journal data region 175-2, and so on.

Prior to flushing (or retrieving and storing a journal) modified data from cache 120-1 to shared storage system 180 for the above example, computer 110-1 writes associated transactions (e.g., journal data) logged in journal system 130-1 to journal data region 175-1. Thereafter, computer 110-1 proceeds to retrieve and thereafter write the modified contents (e.g., modified metadata) of cache 120-1 to the proper locations in storage area 160.

In the event that computer 110-1 crashes (e.g., becomes inoperative) during the process of writing modified data in cache 120-1 to storage area 160, the journal data 170-2 written to the journal data region 175-1 prior to the flush of the cache 120-1 may be replayed by another non-crashed, healthy computer (e.g., computer 110-2, . . . computer 110-n) for recovery purposes. In other words, as a result of the crash, computer 110-1 may corrupt metadata associated with files in the shared storage system. Other computers 110-2, . . . , 110-n learn of the crash as a result of a communication timeout with the crashed computer 110-1. In response, the first computer such as computer 110-2 learning of the failure checks the journal data region associated with the crashed computer 110-1 to determine whether the journal needs to be replayed. If so, the healthy computer 110-2 replays the journal to recover metadata in shared storage system 180.

One or more healthy computers (e.g., a non-failing computers) may detect a failure in a computer having access to the shared storage system 180. The failure can be detected as a result of at least one of failing to receive a heartbeat signal from the computer. According to this embodiment, computers 110 in a cluster 145 are programmed to at least occasionally communicate with each other via a heartbeat signal. If no heartbeat signal is detected in a timeout period, a computer 110 may assume a computer has failed. The computer detecting such a condition may send a message to the potentially failing computer. If the potentially failing target computer does not respond, it can be assumed that the target computer has crashed or failed. An inquiring computer 110 may further check with other computers 110 in the cluster 145 to determine whether the other computers can communicate with the non-responding target computer. If the other computers cannot communicate with the target computer, this corroborates the inquiring computer's suspicion that the target has crashed. Thus, techniques for detecting a crashed computer condition includes receiving a message from another non-failing computer that the computer experiences the failure, and/or attempting to communicate with the computer but failing to receive an acknowledgment message.

Figure 2:
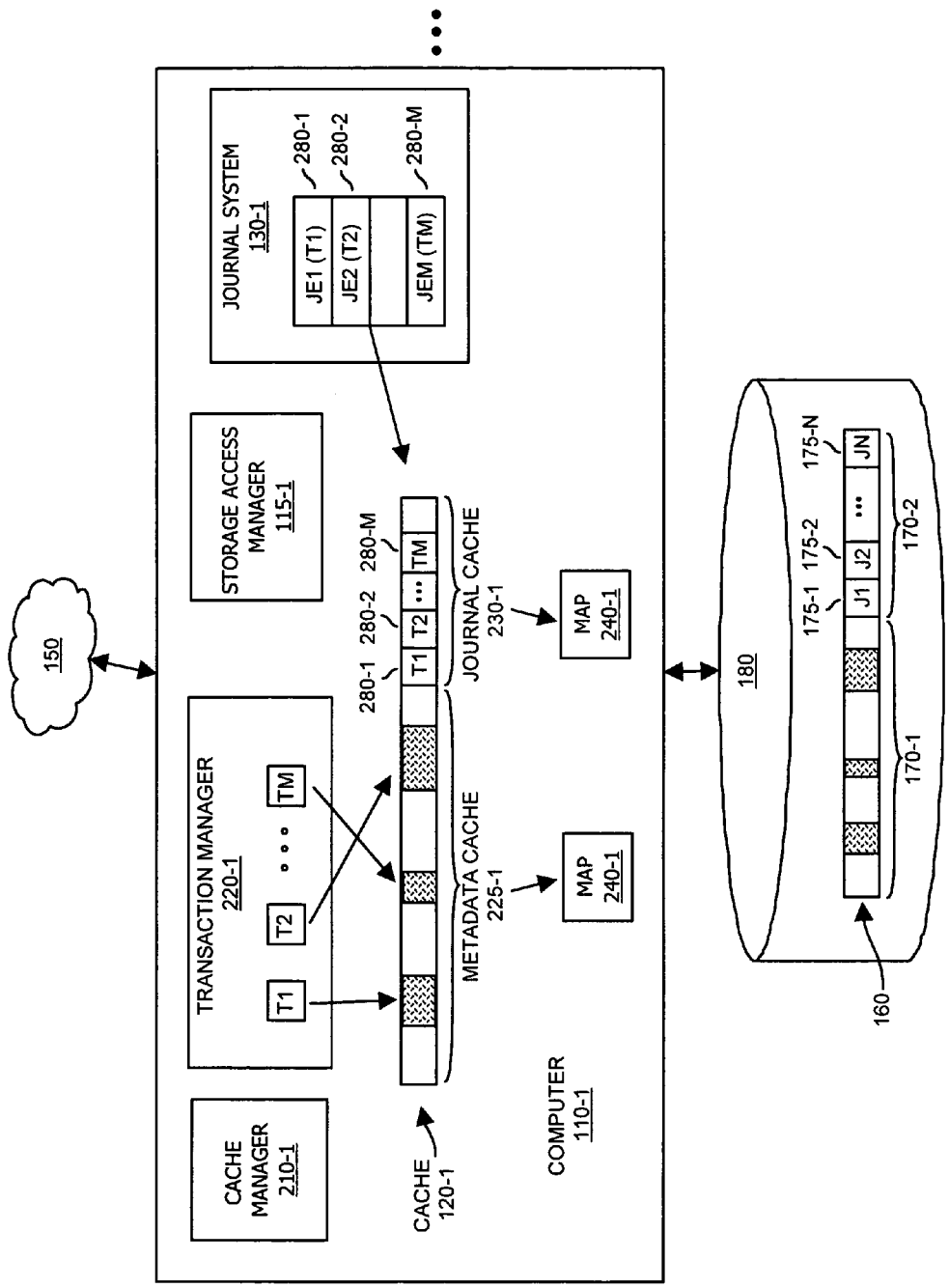
FIG. 2 is a block diagram of a computer maintaining a journal according to an embodiment of the invention

FIG. 2 is a block diagram illustrating a more detailed view of computer 110-1 according to an embodiment of the invention. Other computers 110-2, . . . , 110-n include similar functionality as computer 110-1.

As shown, computer 110-1 includes storage access manager 115-1, cache manager 210-1, transaction manager 220-1, cache 120-1, journal system 130-1, and maps 240. Cache 120-1 includes metadata cache 225-1, and journal space 230-1. Journal space 230-1 includes journal entries 280 (i.e., journal entry 280-1, journal entry 280-2, . . . , journal entry 280-m). Shared storage system 180 includes storage area 160 (e.g., a volume). Storage area 160 includes designated regions for storing user data 170-1 and designated regions for storing journal data 170-2.

In accordance with the example embodiment discussed above, transaction manager 220-1 performs transactions T1, T2, . . . Tm (e.g., modification operations) to specific regions of metadata cache 225-1, which is local to computer 110-1. As discussed, storage access manager 115-1 negotiates with other computers for rights so that computer 110-1 can have exclusive access to specific regions in cache 120-1.

As shown, transaction T1 results in a WRITE to a specific region of metadata cache 225-1. For transaction T1, journal system 130-1 stores a corresponding journal entry 280-1 that identifies the operations associated with the WRITE. Similarly, journal system 130-1 stores a corresponding journal entry 280-2 that identifies the operations associated with transaction T2, and so on. Consequently, the metadata cache 225-1 includes the actual modifications to locally stored metadata (copied from storage area 160) while journal space 230-1 includes journal entries 280 that identify a list of one or more operations that identify executed operations used to modify the corresponding metadata in metadata cache 225-1. Note that the operations in the journal entries 280 of journal space 230-1 can be 're-performed' to replicate the corresponding modifications to the metadata cache 225-1.

Metadata cache 225-1 may be cued to flush its contents depending on system conditions. For example, a computer 110 having a higher priority may request access to the same storage regions as presently locked by computer 110-1. In such a case, prior to relinquishing exclusive access rights, computer 110-1 will eventually flush contents of cache 120-1, via maps 240-1 and 240-2, to corresponding regions in shared storage system 180. In other words, contents of cache 120-1 maps to shared storage system 180 via maps 240. Note that computer 110-1 may flush cache 120-1 in response to cache manager 210-1 detecting that the number of journal entries 280 (or an overall memory space consumed by journal entries 280) exceeds a threshold 292.

As discussed in the above example, prior to attempting a flush of contents in metadata cache 225-1, cache manager 210-1 initiates journal system 130-1 to write journal entries 280 to corresponding journal data region 175-1 in storage area 160. Thereafter, cache manager 210-1 initiates a flush of metadata cache 225-1 to respective locations in storage area 160. As previously discussed, healthy computers utilize the journal stored in journal data region 175-1 to restore contents of the shared storage system 180 without taking the volume offline for an extended period of time.

In one embodiment, it is possible to disable caching of the journal, so that any modifications are written directly to a portion of the shared storage system instead of a separately located journal cache. In such an application, there is a specific order of writing the journal and the metadata. For example, journal entries are written to the shared storage system before the corresponding metadata changes are written to the shared storage system. Thus, if a machine needs to flush metadata in its cache, e.g., because some other machine requests access over the same portion of the storage system, the first machine writes to the corresponding journal entry first.

Figure 3:
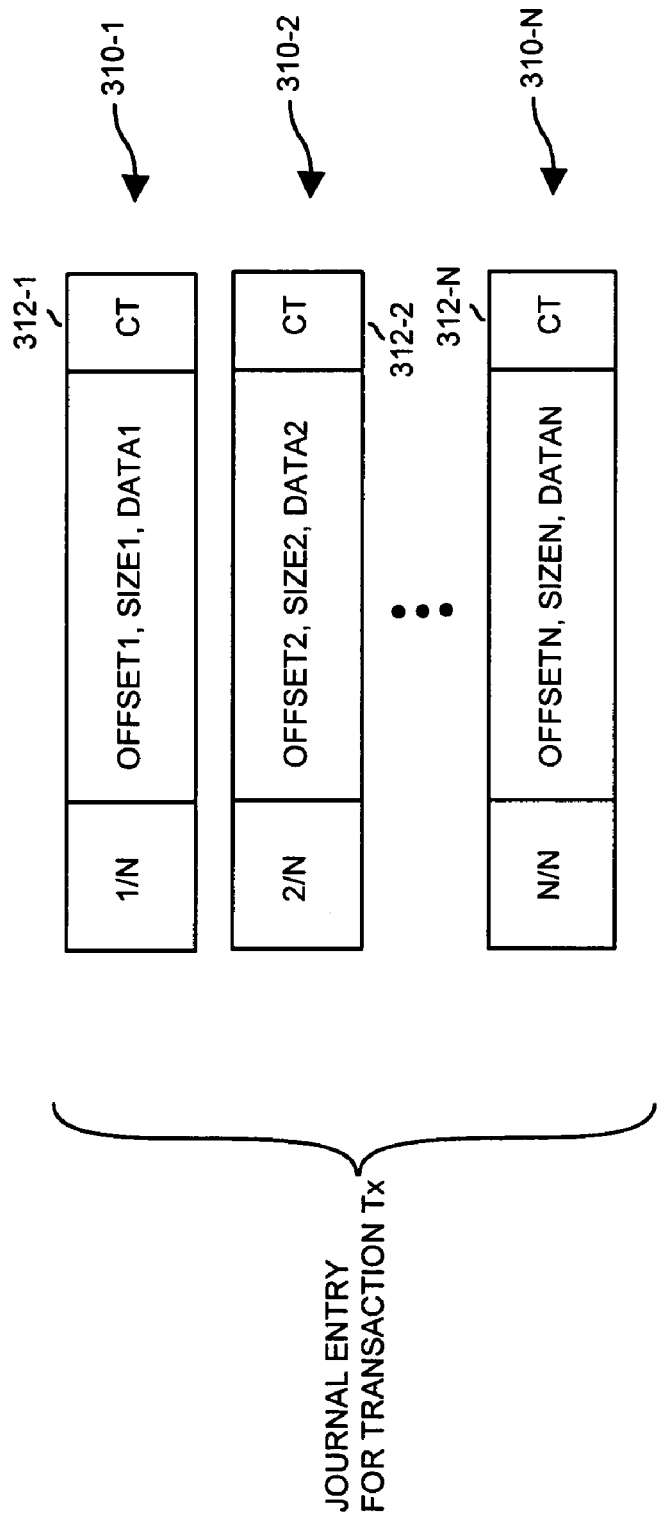
FIG. 3 is a diagram of a journal entry according to an embodiment of the invention.

FIG. 3 is a diagram of a data structure for storing operations (e.g., modification operations associated with a transaction) according to an embodiment of the invention. As shown, transaction Tx includes N modification operations 310 to data in cache 120. In one embodiment, each transaction or journal entry 280 is atomic and idempotent.

Sample journal entry 280 includes a number (which varies depending on modification operations associated with a transaction) of N modification operations 310 performed on data in the cache 120-1 for transaction Tx. Modification operation 310-1 identifies a location, size, and data associated with a modification to metadata in cache 120-1. For example, OFFSET1 indicates the relative location in the cache 120-1 that has been modified. SIZE1 indicates the size of the region to be modified. DATA1 indicates the data written to the modified region. In one embodiment, ID 312-1 is a time stamp (e.g., cluster time) indicating a relative time when the modification operation 310-1 was performed on data in the cache 120-1.

In the event of a computer crash, the cluster time 312 is used to determine whether to replay a particular transaction stored in a journal. Cluster time increases as time advances so that more recent cluster times are larger than older cluster times. Newer modifications trump older modifications to metadata in cache 120-1. Thus, certain modification operations need not be replayed after a crash if the modification operations in a journal are trumped by newer modification operations to the same region. This will be discussed in more detail later in the specification.

An example of a transaction would be moving a selected file in the shared storage system from the root directory to a non-root directory in a particular volume. Such a transaction involves two modification operations. First, the transaction manager removes the pointer in the root's B-tree to the file. Second, the transaction manager inserts a pointer from the B-tree of the new directory to the selected file. Thus, there are two changes to corresponding metadata in cache 120. This is an example of one transaction such as an atomic set of operations to be performed on cached metadata. Other example transactions include renaming a file, modifying size of a file, adding files, deleting files, creating directories, etc.

Figure 4:
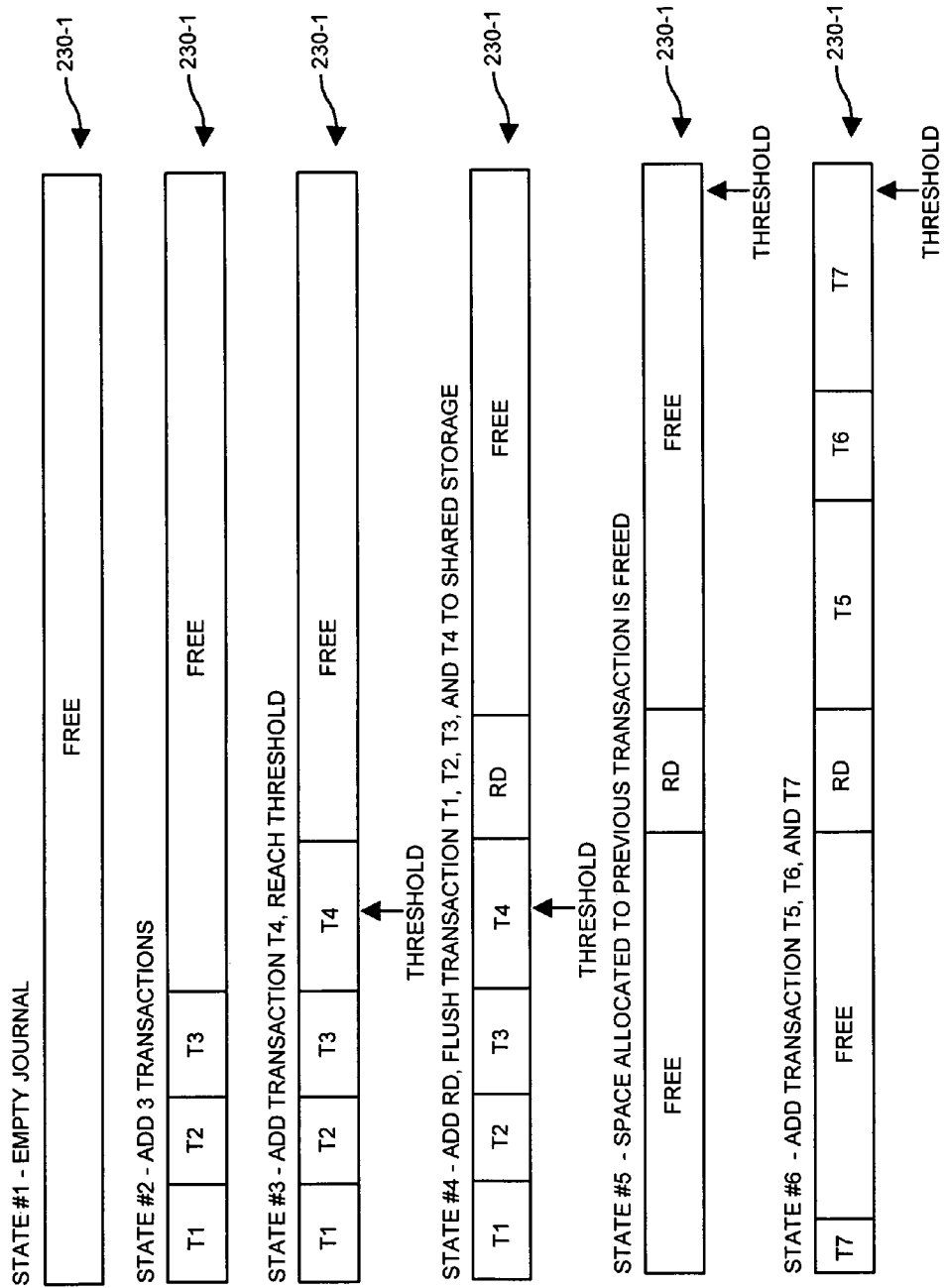
FIG. 4 is a diagram of a journal space according to an embodiment of the invention.

FIG. 4 is a diagram of a journal space 230-1 (or layout) in different states according to an embodiment of the invention. Journal space 230-1 is limited in size to a portion of cache 120-1. Initially, journal system 130-1 fills journal space 230-1 with successive transactions. Eventually, the journal system 130-1 flushes contents (e.g., journal entries 280) of the journal space 230-1 to the appropriate location in shared storage 180. Flushing may be periodic, random, or result from a triggering event such as the journal space being filled to capacity. In some respects, journal space 230-1 may be viewed as a donut because WRITES to the journal space 230-1 wrap around to the beginning of the journal space 230-1 after being completely filled. Typically, the journal space 230-1 is flushed before wrapping around and writing over non-flushed journal entries 280.

In state 1, the journal space 230-1 is empty.

In state 2, journal system 130-1 adds transactions T1, T2, and T3 into corresponding journal entries 280 of the journal space 230-1.

In state 3, journal system 130-1 adds transactions T4 to corresponding journal entries 280 of the journal space 230-1. At this point, contents of the journal space 230-1 have exceeded a threshold, T.

In state 4, before flushing journal space 230-1, journal system 130-1 stores region dump information, RD, (e.g., a snapshot of information identifying access rights of one or multiple computers 110 at a particular cluster time). In general, the RD information helps to identify which regions of the shared storage system 180 need to be reconstructed in the in the event of a failure. In one embodiment, the RD is an array of triads, each including a START address, an END address, and a cluster time value describing a region and corresponding relative time when a particular computer 110 in cluster 145 (in this case, computer 110-1) had exclusive access the corresponding region between START and END.

In state 5, journal system 130-1 has flushed transactions T1, T2, T3, and T4 from the journal space 230-1 to journal data region 175-1 of shared storage system 180. Before discarding old journal entries 280 in journal space 230-1, the journal system 130-1 ensures that the RD following journal entries for T1-T4 is properly stored to the respective journal data region 175-1 in the shared storage system 180. Additionally, journal system 130-1 ensures that the modifications made by transactions T1-T4 would not be overwritten by older data contained in another computer's journal in a subsequent journal replay. This latter technique is achieved by adding the special journal entry Region Dump (RD). As discussed, the cluster time CT of the RD points to the last time when the machine (e.g., computer) had exclusive or shared access over a corresponding region. If the computer 110-1 has exclusive or shared access to a particular region, then the CT of the triad for that region will be the current Cluster Time. Otherwise, CT will be the time when the machine gave exclusive access for the region to another machine. Thus, all regions with exclusive or shared access will have a CT equal to the current CT. The regions with no access will have a smaller CT since the rights were given away at some point in the past. RDs also provide optimization when replaying journals since its not necessary to replay regions in journal entries 280 preceding an RD because these regions are guaranteed to be flushed already.

In one embodiment, a purpose of the RD (i.e., Region Dump) is to compensate for the information lost when discarding journal entries 280 for transactions T1-T4. Since the information contained in them would prevent older data from another journal to be replayed they cannot be discarded and subsequently overwritten without preserving the ownership rights described in these JEs. An RD is typically many times smaller than the journal entries 280 it describes. Thus, it is possible to free space for new journal entries 280 JEs without losing precious information about ownership rights.

Figure 5:
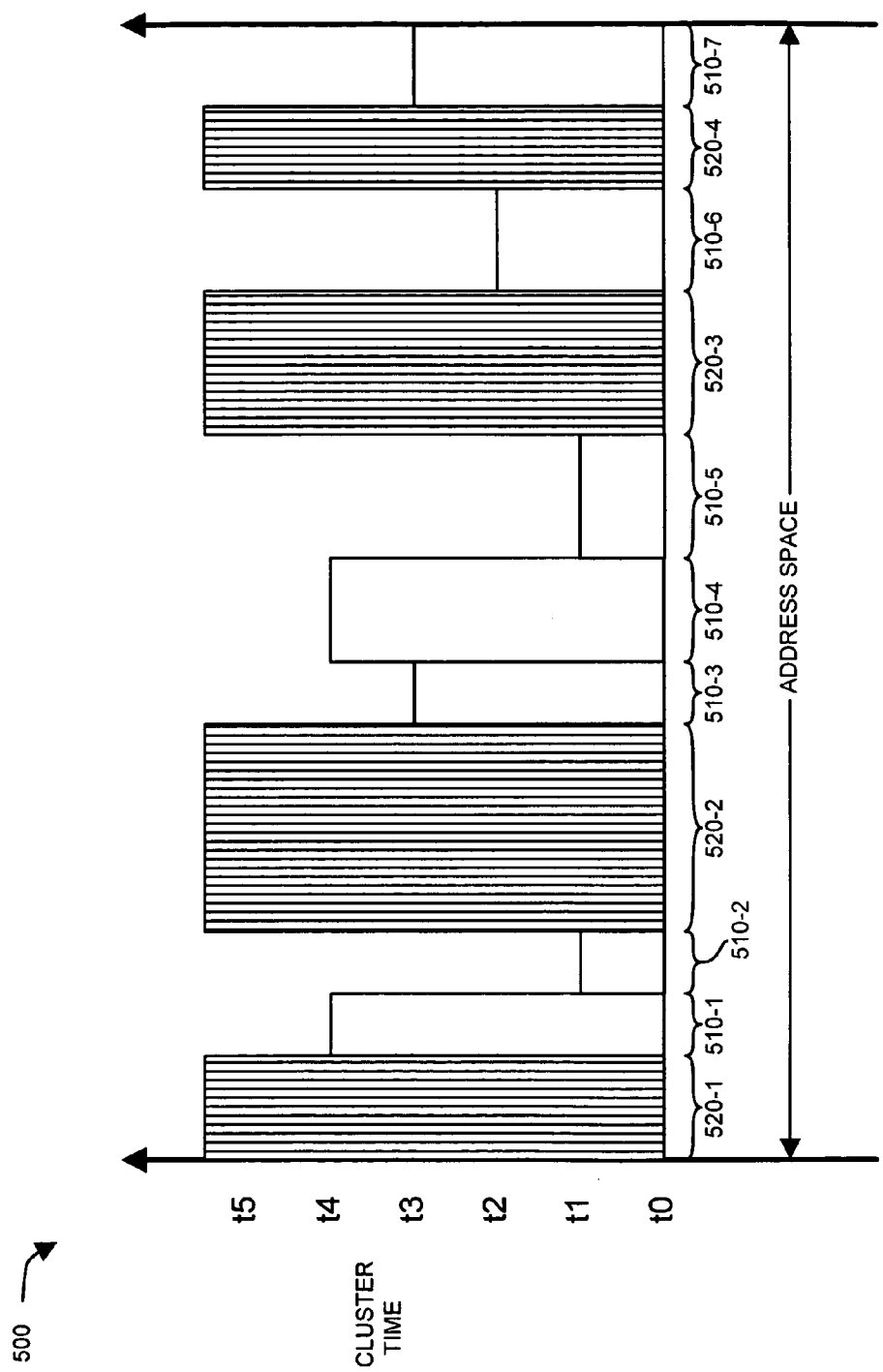
FIG. 5 is a timing diagram illustrating ownership of access rights by different computers according to an embodiment of the invention.

FIG. 5 is a diagram of a sample region dump map 500 according to an embodiment of the invention. Region dump map 500 (or RD map 500) indicates that the computer taking the snapshot of operation locks database (RD should not be confused with the in-memory op-lock database) had shared or exclusive ownership of address ranges 520-1, 520-2, 520-3, and 520-4 up until the present cluster time. Region dump map 500 indicates that the computer taking the snapshot did not have any access rights in address ranges 510-1, 510-2, 510-3, 510-4, 510-5, 510-6, and 510-7 because it is known that another computer 110 in the cluster 145 had exclusive rights for those address ranges during the cluster times indicated.

Referring again to FIG. 4, in state 6, journal system 130-1 adds transactions T5, T6, and T7 to corresponding journal entries 280 of the journal space 230-1. Note that journal system 130-1 fills journal space 230-1 by wrapping information associated with transaction T7 around to a start location of journal space 230-1.

As previously discussed, one aspect of the invention is journal replay, which occurs after a computer 110 crashes. A crash may occur before, during, or after the process of attempting to write metadata to shared storage system 180. In general, journal replay involves detecting failed computers 110 in cluster 145 and providing notification so that one or more journal systems 130 can replay the journal of the crashed machine.

Note that there are two types of computers 110 in a cluster 145, offline and online cluster members. In one embodiment, the journals of all offline cluster members are scanned, regardless of whether they left the cluster normally or abnormally (e.g. crashed). Only one journal replay session at a time can be running in the cluster 145.

According to one embodiment, journal replay is a three-stage process.

Figure 6:
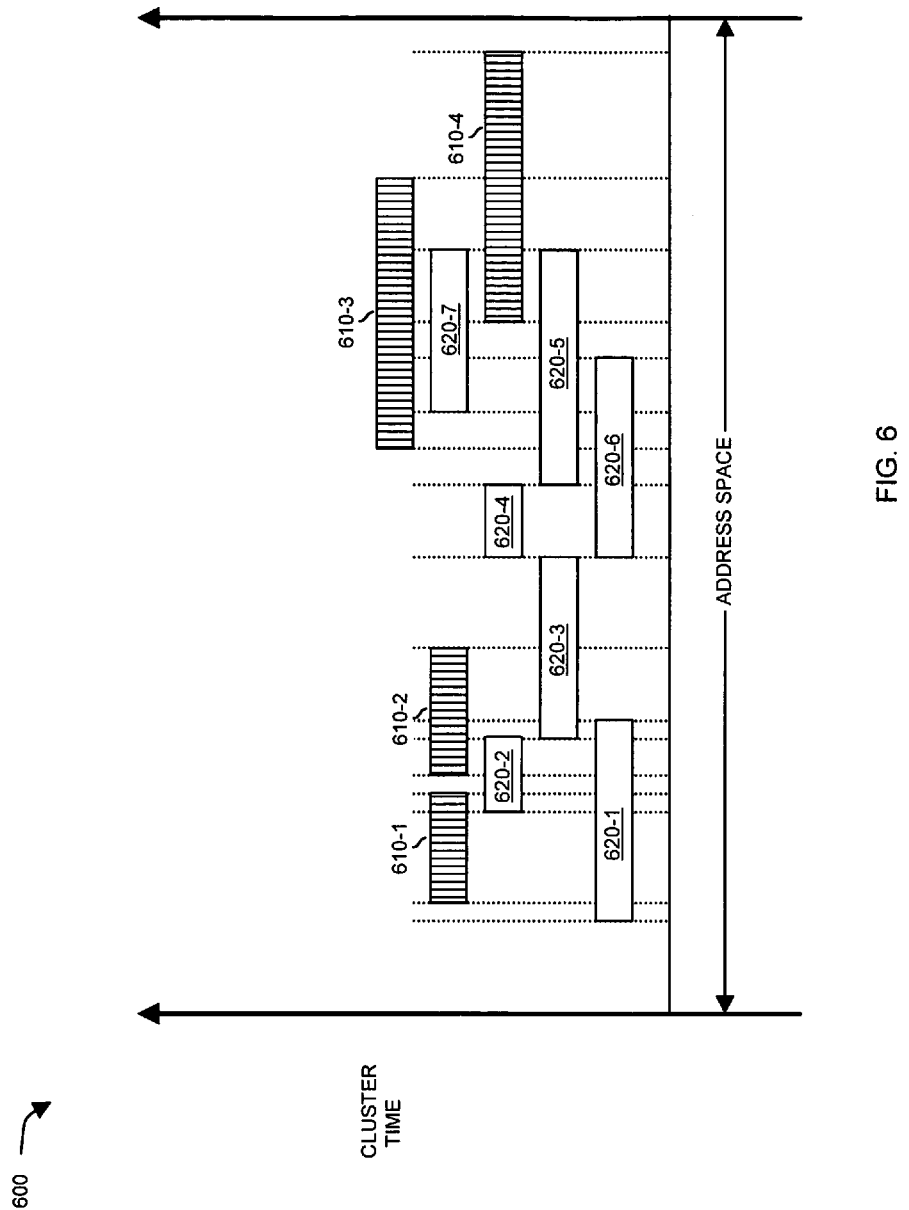
FIG. 6 is a timing diagram illustrating regions of modified data at different times according to an embodiment of the invention.

In stage 1, the journals in of all offline machines are scanned. For example, a healthy computer 110 in the cluster 145 extracts journal entries 280 and region dumps (RDs) of the corresponding journals stored in journal data regions 175 of shared storage system 180. The healthy computer reconstructs a region map 600 (as shown in FIG. 6 according to an embodiment of the invention) covering the address space associated with the regions contained in the journal entries 280 and RDs. Each region of the region map 600 has a corresponding time stamp (e.g., cluster time stamp) indicating when a corresponding transaction associated with the region occurred. As shown in FIG. 6, region map 600 includes data regions 620-1, 620-2, 620-3, 620-4, 620-5, 620-6, and 620-7 which indicate locations in the shared storage system 180 associated with journals of one or more offline computers in cluster 145. Region map 600 also includes ownership rights regions 610-1, 610-2, 610-3, and 610-4, which indicate locations in the shared storage system 180 in which another non-failing computer in cluster 145 had exclusive ownership rights.

Thus, region map 600 includes two types of regions: a.) data regions 620, which refer part of a region or a full region from a journal entry 280 contained in a corresponding journal (the time stamp or cluster time of each journal entry indicates when a corresponding modification operation took place), and b.) ownership right regions 610, which contain time stamps and regions in the corresponding RDs of a journal. As discussed, a computer 110 constructing this map region 600 utilizes this information to prevent older modifications from being replayed because it is known that such modifications are trumped by potentially newer modifications (e.g., those higher on region map 600).

In one embodiment, the generation of region map 600 includes the following steps:

A. Initially the region map 600 contains only one ownership rights region 620 covering the whole address space and having a CT=0.

B. A journal belonging to an offline cluster member is scanned. JEs (i.e., journal entries) and RDs are extracted from the scanned journal in the journal data regions 175 of the shared storage system 180. For each region in a journal entry 280, a data region 620 referring to it is created. CT of the data region is the CT or time stamp of the journal entry 280. Ownership rights regions 610 are created for each entry in a RD.

C. The regions are placed on region map 600. Regions with greater CT are placed higher in the region map 600. Higher regions overshadow and trump lower regions. Eventually, the revised region map 700 is created. The revised region map 700 (in FIG. 7) includes only data regions 620 or ownership regions 610 that are not overshadowed by another region. Some regions might be split in multiple pieces while others might be completely discarded. This explains why a situation may occur in which nothing gets replayed as mentioned above.

Figure 7:
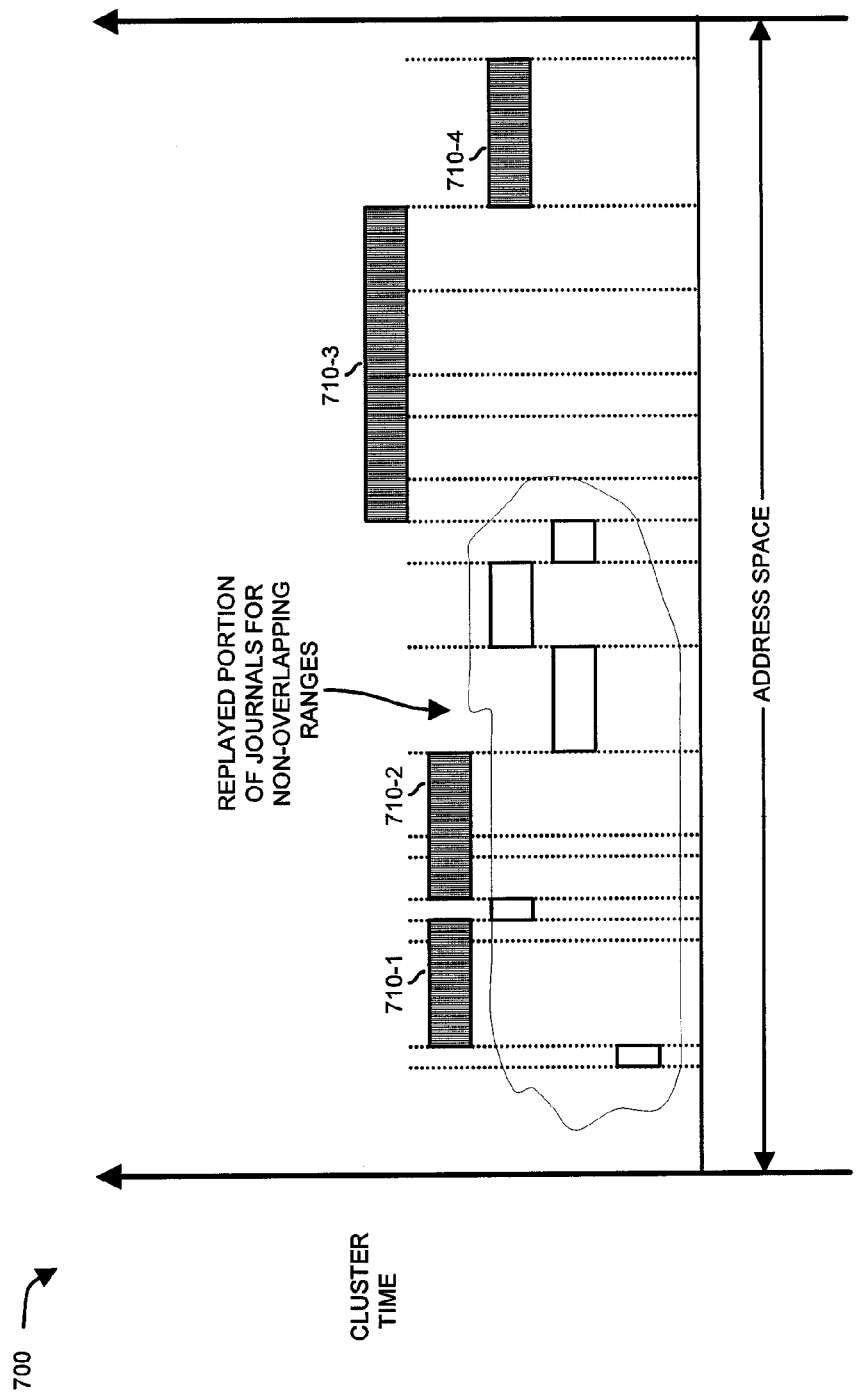
FIG. 7 is a diagram illustrating replayed portions of one or more journals to fix corrupted data in a shared storage system according to an embodiment of the invention.

D. Steps B and C are repeated for each journal belonging to an offline cluster member. The region map 600 are gradually updated and finally the regions with highest cluster times remain in the region map 600 as shown in FIG. 7.

This same method of generating the region map 600 and revised region map 700 applied in stage 2 can be repeated to determine if the online members have made any newer modifications. In this instance, the ownership rights regions 610 are generated based on access right information (e.g., op-lock database) from the online computers and the data regions 620 are those remaining from stage one.

In stage 2, the healthy computer generating the region map extracts non-overlapping data regions in stage 1. These are potential candidates to be replayed as shown in FIG. 7. This list of candidate regions is broadcasted to the online cluster members, if there are any in cluster 145. Each online cluster member examines the list of candidate regions and uses its corresponding Oplock Database (e.g., a database indicating which regions and times the corresponding cluster member reviewing the journal had exclusive access to the regions) to decide which regions to discard based on knowing that the reviewing cluster member modified a given region some time after the crashed machine attempted to modify the given region. In other words, the reviewing cluster members identify which regions they provided later modification to a region. In this case, the regions, in which the reviewing cluster member had later exclusive access rights than the failed computer, need not be overwritten with the modifications identified by the journal of the failed computer 110. FIG. 7 is a diagram of a revised region map 700 according to an embodiment of the invention. As shown, only the non-overlapping data regions 710-1, 710-2, 710-3, and 710-4 in the revised region map 700 are candidates for being replayed by a healthy computer 110 in cluster 145.

In stage 3, the remaining data regions generated in stage two (e.g., as identified in FIG. 7) are replayed by a healthy computer to fix the metadata in the shared storage system 180. The data regions point to the exact place within their corresponding journal where the data is located, so the data is read from the journal and then written to the required place on the shared storage system 180. As mentioned, a data region may be only a piece of the original region to which it refers. In this instance, only the piece is replayed, not the whole region. Some data regions may not be replayed at all.

Figure 8:
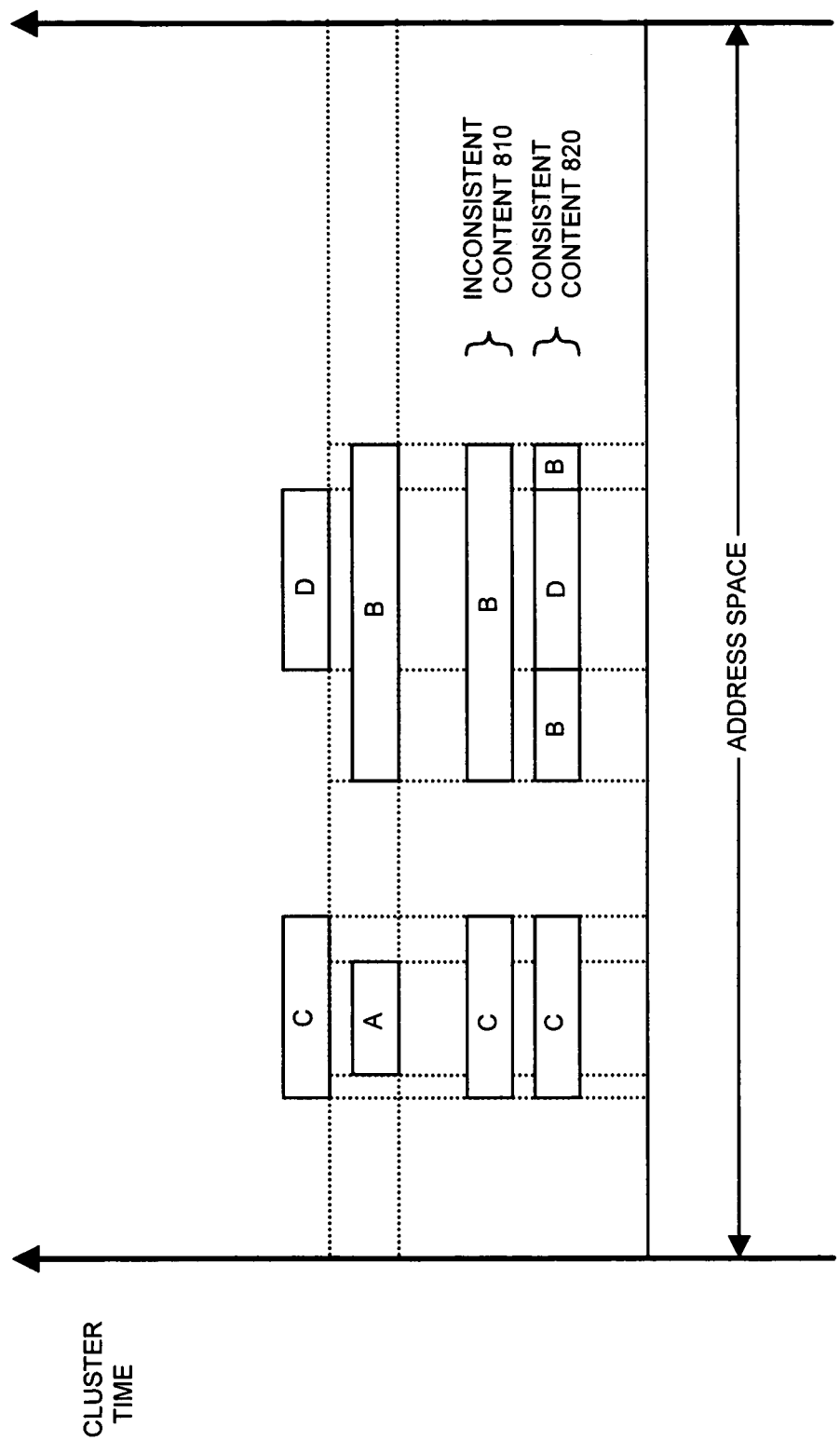
FIG. 8 is a timing diagram illustrating how data in a shared storage device may be corrupted as a result of one or more computer failures according to an embodiment of the invention.

FIG. 8 is a diagram illustrating sample transactions associated with a crashed computer and potential storage results according to an embodiment of the invention. As shown, assume that computer 110-1 initially performs transaction T1 on metadata regions A and B stored in corresponding cache 230-1. Recall that computer 110-1 initially retrieves the metadata from the shared storage system 180 and computer 110-1 performs local modifications (i.e., transaction T1 on regions A and B at time t1). Assume further that data modifications associated with regions A and B are properly flushed to shared storage system 180. Computer 110-1 performs transaction T2 on regions C and D at time t2. This involves retrieving the metadata from the shared storage system 180 again and thereafter performing local modifications (i.e., transaction T2 on regions C and D at time t2).

Assume that computer 110-1 crashes while flushing contents of metadata cache 225-1 after locally performing transaction T2 on regions C and D at time t2. More specifically, assume that computer successfully writes modifications associated with region C, but not those associated with region D. In this instance, storage area 160 will include inconsistent content 810 instead of consistent content 820 that would be written to storage area 160 of shared storage system 180 if computer 110-1 were to complete the flush successfully. Note that transaction T2 may be performed by another computer in cluster 145 rather than a single computer 110-1. The above example is meant to show the consequences of violation of the atomicity of a transaction due to a crash. There would be nothing wrong if 4 unrelated transactions modified 2 regions and one of them failed to store the data. However, if two transactions modified the regions as described above, and the later transaction succeeds to write one of the regions but fails with the other, its atomicity would be broken. Thereafter, the journal is replayed to the other region in order to restore consistency.

Cluster Time Persistency

One purpose of cluster time persistency is to ensure journal space reusability without the need to reset all the journals of offline members in the cluster to their initial empty state.

As discussed above, the journals of the offline computers 110 are used as an offline Oplock Database with ownership rights. However, for the sake of efficiency, the journals are reusable. For example, upon entering the cluster 145, a new cluster member computer 110 would be assigned a free journal data region 175 for storing journal information. A newly assigned journal data region 175 may contain JEs and RDs written by some other computer that is now offline. Thus, the new cluster member cannot reset the journal to its initial empty state because this may mean losing some important journal information that must be used to repair contents of the shared storage system 180.

Again, see the example in FIG. 8 which illustrates how erasing journal information can cause data corruption. Assume that transaction T1 is performed by machine M1 (computer 110-1) and transaction T2 is performed by machine M2 (e.g., computer 110-2). When machine M2 crashes, another computer 110 replays its journal. Assume that a new machine M3 enters the cluster 145, is assigned M2's former journal and erases the journal. Assume machine M1 crashes and no other machine made any modifications to these particular regions after M2 crashed. Since M2's journal is erased there's nothing preventing regions from M1's journal from being replayed. But M1's regions contain older data—thus data corruption is present. To prevent this form happening a reused journal is not reset, but instead continued at after the last JE or RD written in it. In FIG. 4, the journal when assigned for use by a new computer would continue after the JE for T7.

Cluster time, CT, prevents older data from being overwritten onto newer data. So CT itself cannot be reset to 0. It has to be persisted when there are no online cluster members to keep it. If cluster time for cluster 145 does not persist for some reason, this type of failure could occur:

1. A cluster of 2 machines M1 and M2 may be working.
2. When M1 and M2 reach a CT of 100,000 both machines might experience a crash.
3. A new machine—M3 replays both machines journals and takes over M1's journal. The cluster time of M3 is 0.
4. M3 starts making new modifications and some of them overwrite older ones made by M1 and M2.
5. M3 crashes at CT less than 10,000.
6. M3's journal is replayed, but M1's journal and M2's journal contain modifications with CT close to 100,000, whereas T3's regions CT are less than 10,000. Thus, M3's newer modifications may be lost if cluster time rolls over or resets to 0.

To prevent this type of failure, a machine performing journal replay sets its CT counter or clock to the largest value of its current CT based on the maximum CT found throughout the JEs 280 and RDs in the scanned journals in shared storage system 180. This ensures that new transactions will have CT time stamp greater that any transactions described in any of the journal that has been replayed or not yet replayed.

As discussed, journal replay is done only when one or more computers leave the cluster abnormally (crash/power failure). However all machines may leave in a normal fashion. CT is persisted in a designated location on the shared storage system 180 to avoid rescanning all journals when a machine re-enters a cluster with no online cluster members. Upon leaving the cluster each machine performs one last transaction and updates the value at this location with its current CT. So the last machine to leave the cluster 145 will write the largest CT reached during the lifetime of the cluster 145.

In one embodiment, no journals are ever reset to their initial state. Cluster time persistence is the mechanism that makes it possible to avoid journal resetting.

The CT value in the designated location is something like a bookmark indicating the time of the last modification that happened in the cluster. It is particularly useful upon entering an empty cluster. If the designated location did not exist, the first machine entering an empty cluster would have to scan the journals of all offline machines to the latest transaction and get its CT. However this is much heavier operation than just retrieving a single value from a known location in shared storage. So keeping the CT value at a designated location in the shared storage is a optimization that allows skipping rescans of all journals upon entering an empty cluster whose members all left in a normal fashion at some point in the past.

Figure 9:
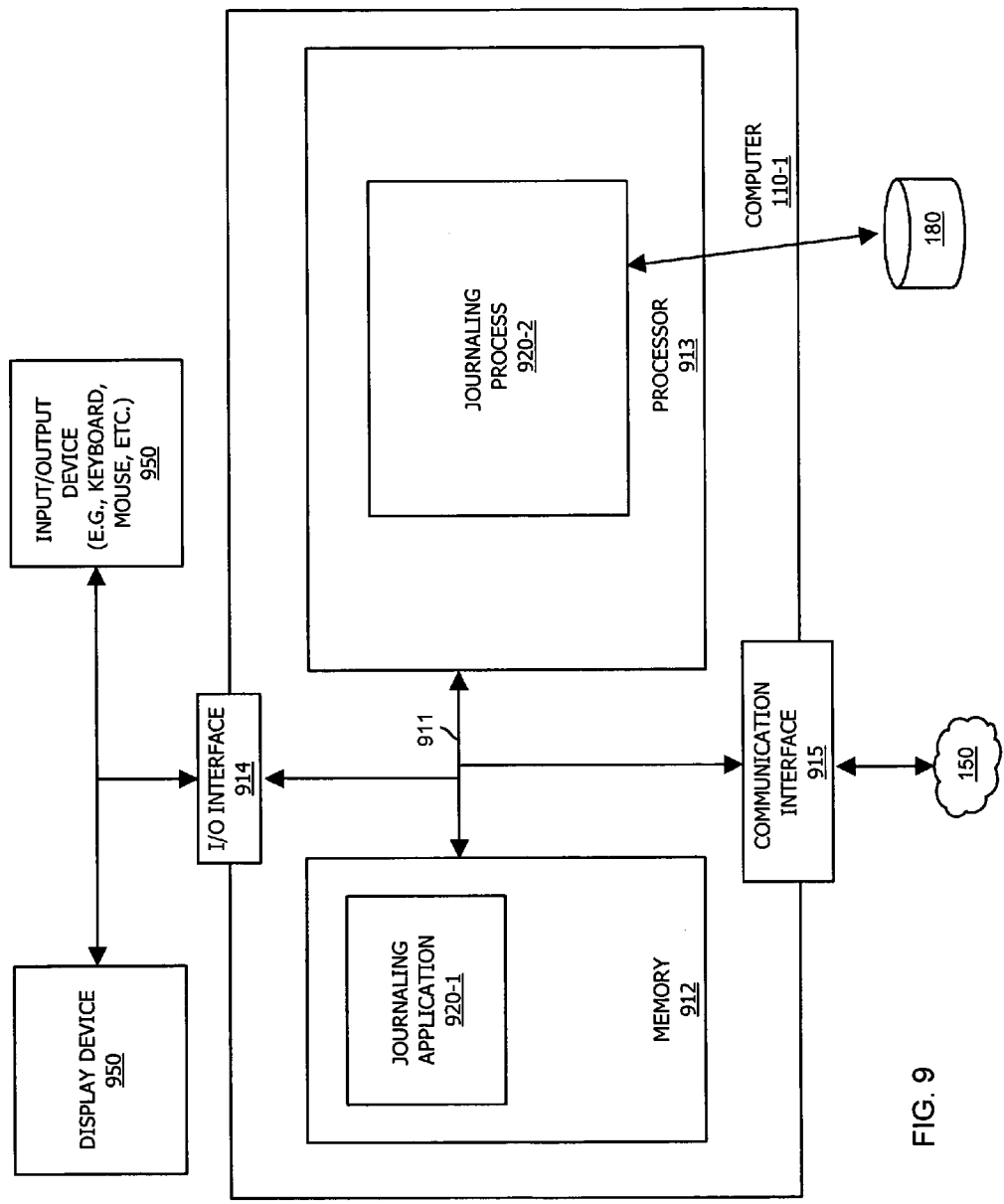
FIG. 9 is a more detailed diagram of a computer for executing a journal software application according to an embodiment of the invention.

FIG. 9 is a block diagram illustrating an example architecture of computer system 110 according to embodiments of the invention. Computer system 110 may be a computerized device such as a personal computer, workstation, portable computing device, console, network terminal or the like. As shown, computer system 110 of the present example includes an interconnect 911 that couples a memory system 912, a processor 913, an input/output interface 914 and a communications interface 915. Peripheral device 916 (e.g., input/output devices such as one or more viewer controlled devices such as a keyboard, mouse, etc.) couples to processor 913 through I/O interface 914 and enables user to provide input commands and thus generally control applications on display device 930. Shared storage system 180 journals, file system metadata, application data, etc. Communications interface 915 enables computer system 110-1 (and corresponding users) to communicate with other computers 110 over network 150.

As shown, memory 912 is encoded with journaling application 920-1 supporting the distributed file system as discussed herein. Journal application 920-1 may be embodied as software code such as data and/or logic instructions (e.g., code stored in the memory or on another computer readable medium such as a disk) that supports processing functionality according to different embodiments of the invention as described herein. During operation, processor 913 accesses memory 912 via the interconnect 911 in order to launch, run, execute, interpret or otherwise perform the logic instructions of the journaling application 920-1. Execution of journaling application 920-1 produces processing functionality in journaling process 920-2. In other words, the journaling process 920-2 represents one or more portions of the journaling application 920-1 (or the entire application) performing within or upon the processor 913 in the computerized device 110.

It should be noted that the journaling 920 executed in computer system 110 is represented in FIG. 9 by either one or both of the journaling application 920-1 and/or the journaling process 920-2. For purposes of the discussion of the operation of embodiments of the invention, general reference will be made to the journaling application 920 as performing the various steps and functional operations to carry out the features of embodiments of the invention.

It should also be noted that embodiments of the invention include the journaling application 920-1 itself (i.e., the unexecuted or non-performing logic instructions and/or data). The journaling application 920-1 may be stored on a computer readable medium such as a floppy disk, hard disk or in an optical medium. The journaling application 920-1 may also be stored in a memory type system such as in firmware, read only memory (ROM), or, as in this example, as executable code within the memory system 912 (e.g., within Random Access Memory or RAM). In addition to these embodiments, it should also be noted that other embodiments of the invention include the execution of journaling application 920-1 in processor 913 as the journaling process 920-2. Thus, those skilled in the art will understand that the computer system 110 may include other processes and/or software and hardware components, such as an operating system that controls allocation and use of hardware resources.

General functionality supported by computer system 110 according to embodiments of the invention will now be discussed with respect to flowchart 1000 in FIG. 10 as discussed above in connection with respect to FIGS. 1 through 9.

Figure 10:
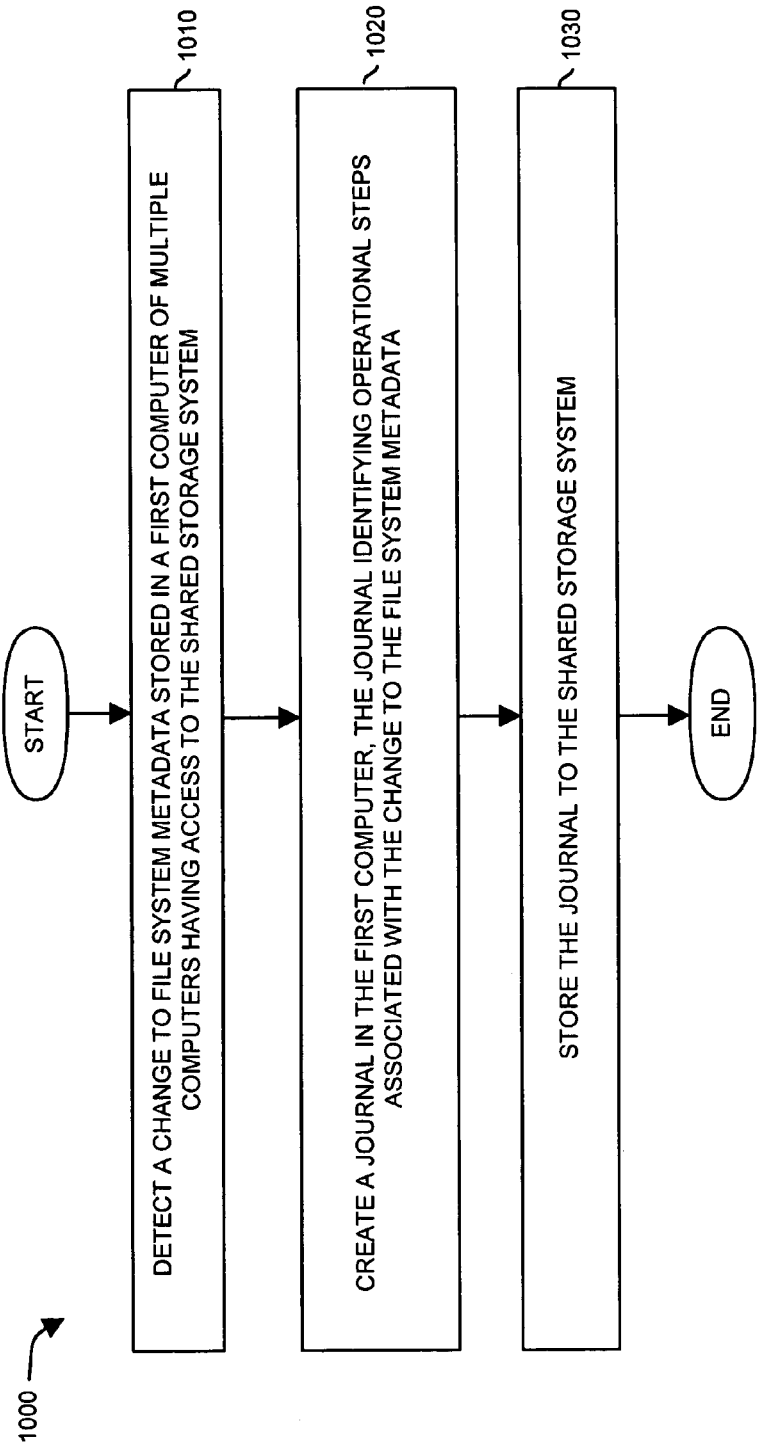
FIG. 10 is a flowchart illustrating a general technique of journaling according to an embodiment of the invention.

FIG. 10 is a flowchart 1000 of processing steps performed by journaling application 920 according to an embodiment of the invention. In general, flowchart 1000 illustrates how journaling application 920 enables computer system 110 to access shared storage system 180 without corrupting its metadata. Note that the discussion of FIG. 10 will include occasional references techniques as discussed in the previous figures.

In step 1010, computer 110-1 detects a change to file system metadata stored in corresponding cache 120-1. Computer 110-1 is one of multiple computers 110 in cluster 145 having access to the shared storage system and the change may be initiated by a user modifying a file retrieved from shared storage system 180.

In step 1020, in response to detecting the change to the file system metadata in the computer 110-1 (e.g., as a result of a user modifying a file in the shared storage system 180), the computer 110-1 and, more specifically, journal system 130-1 locally creates a journal for storage in journal space 230-1. In one embodiment, the journal stored in journal space 230-1 identifies operational steps associated with the change to the file system metadata.

In step 1030, the processor 913 in computer 110-1 initiates storage of the journal in cache 230-1 to the shared storage system 180. Based on this technique, the journal stored in the shared storage system 180 can be replayed or executed to reproduce the change associated with the file system metadata. Thus, in the event that the change is lost due to computer 110-1 crashing, the change can be reproduced.

Figure 11:
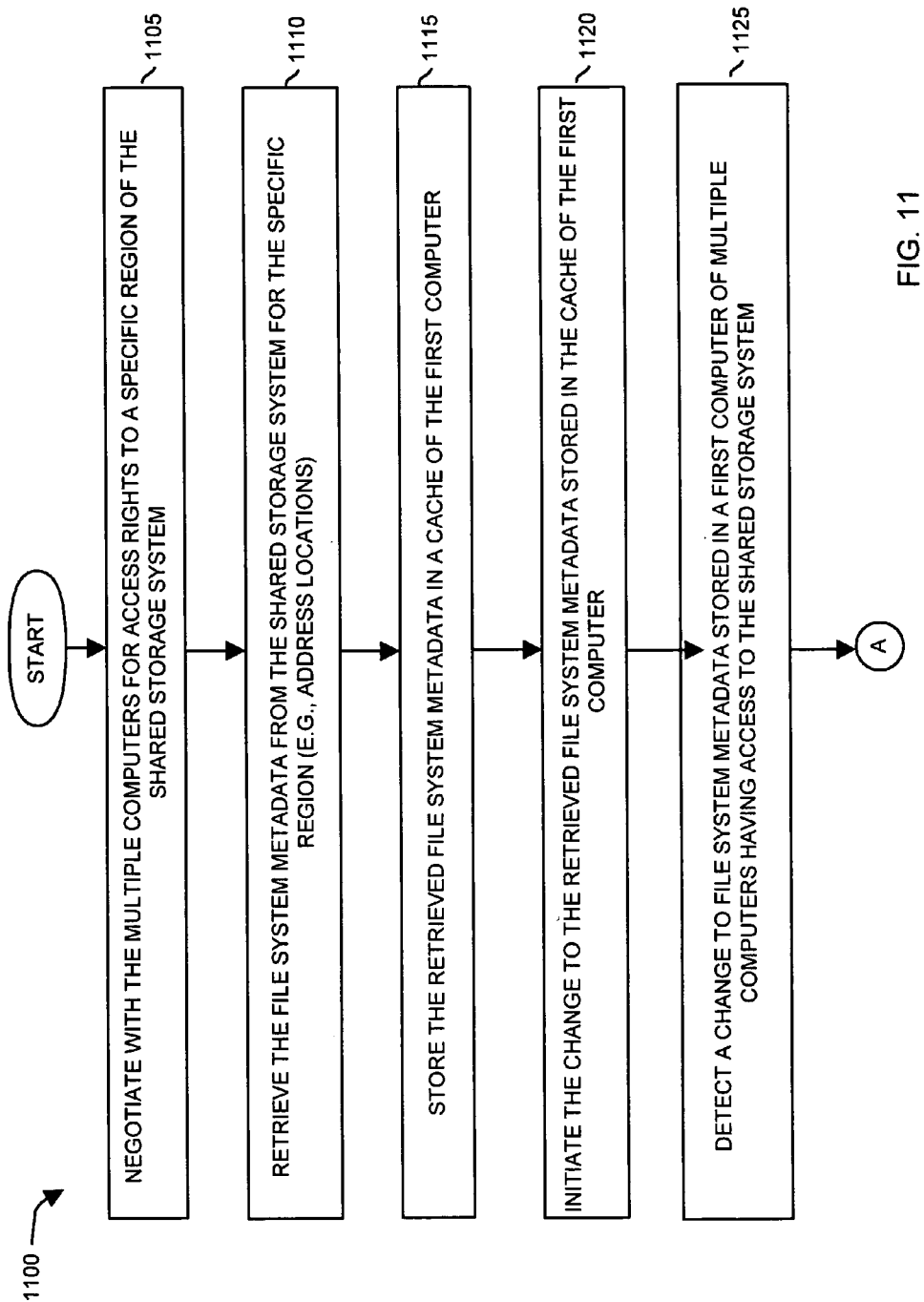
FIGS. 11 and 12 combine to form a flowchart illustrating a more detailed technique for journaling data information according to an embodiment of the invention.
Figure 12:
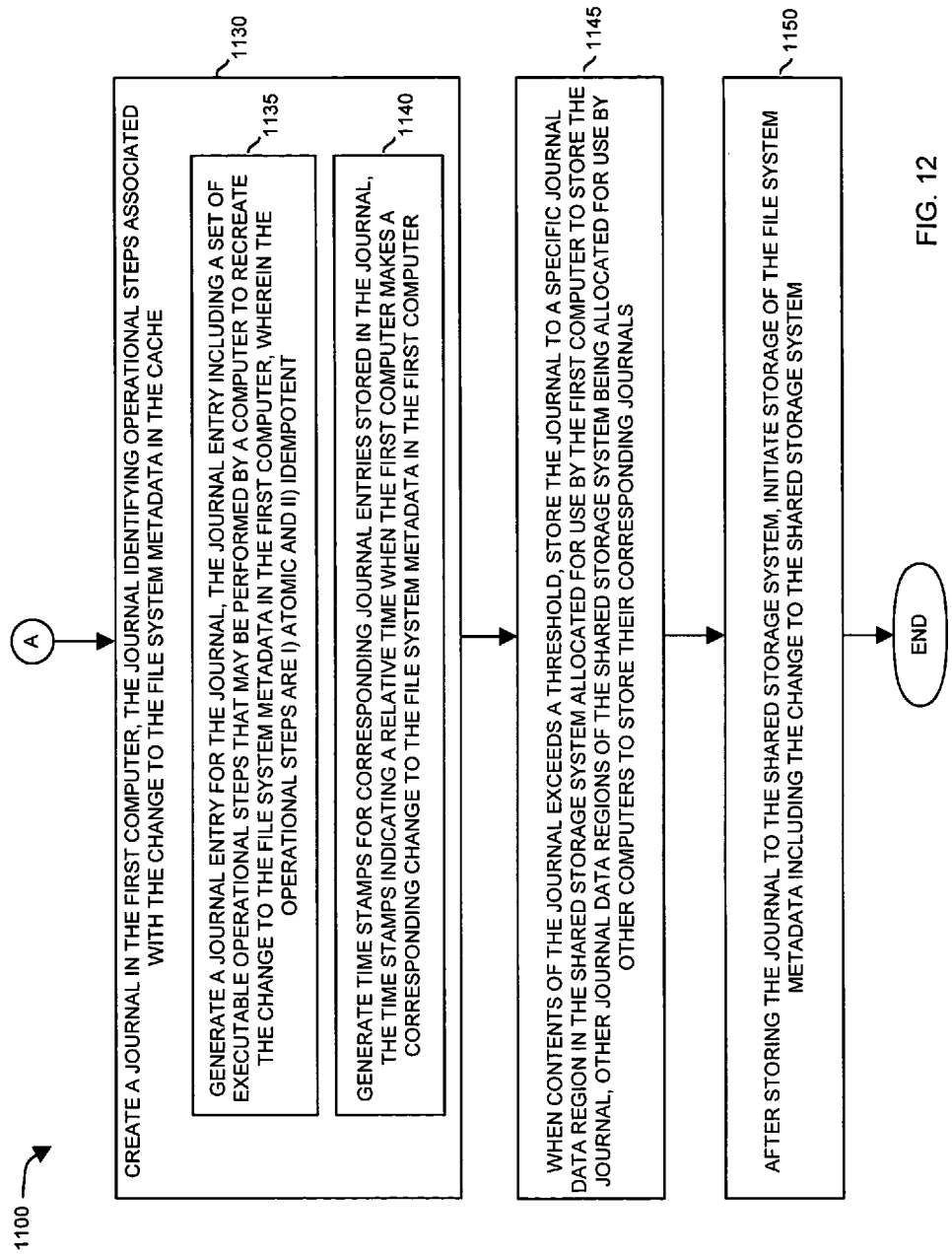

FIG. 11 is a flowchart 1100 illustrating a more specific set of processing steps performed by journaling application 920 according to an embodiment of the invention. Note that FIG. 11 includes functionality that overlaps with the technique discussed in FIG. 10.

In step 1105, the processor 913 of computer 110-1 negotiates with other computers in cluster 145 for access rights to a specific region of the shared storage system 180.

In step 1110, after successful negotiation for access, the computer 110-1 retrieves the file system metadata from the specific region of the shared storage system 180.

In step 1115, the computer 110-1 then stores the retrieved file system metadata (or other type of data retrieved from the shared storage system) in its corresponding metadata cache 225-1. Accordingly, based on use of computer 110-1, a user may access a file or portion of a file in the shared storage system 180 to modify its contents.

In step 1120, as a result of further processing, the processor 913 of computer 110-1 (potentially in response to user input) initiates a change to the retrieved file system metadata stored in its corresponding metadata cache 225-1.

In step 1125, the processor 913 of computer 110-1 detects a change to the file system metadata stored in the metadata cache 225-1.

In step 1130, the computer 110-1 creates a corresponding journal for storage in the journal space 230-1. The journal identifies operational steps associated with making the change to the file system metadata in the metadata cache 230-1.

In sub-step 1135, the computer 110-1 generates a journal entry 280 for storage in journal space 230-1. The journal entry 280 includes a set of executable operational steps reflecting the change to the file system metadata in the first computer. In one embodiment, the operational steps associated with a particular journal entry 280 are i) atomic and ii) idempotent.

In sub-step 1140, computer 110-1 generates (cluster) time stamps for corresponding journal entries 280 stored in journal space 230-1. The (cluster) time stamps indicate a relative time when the computer 110-1 makes a corresponding change to the file system metadata in metadata cache 230-1 the first computer relative to operations in other computers 110 in cluster 145. As discussed, the (cluster) time stamps may be used at a later time to aid in reconstruction of the file system metadata in the shared storage system 180 in the event that computer 110-1 experiences a crash.

In one embodiment, computer 110-1 maintains access right data (e.g., operation locks data) identifying which of the multiple computers 110 in cluster 145 has (or had) access to different regions of the shared storage system 180 at different times. The processor 913 in computer 110-1 stores at least a portion of the access right information (e.g., RD information) to the journal along with the operational steps as mentioned. During reconstruction or replay of the journal by another healthy computer, the access right information may be used to identify which operations in the journal need to be replayed. This was previously discussed with respect to FIGS. 5-8 above.

In step 1145, computer 110-1 stores or flushes contents of the journal cache 230-1 to a specific journal data region 175-1 in the shared storage system 180 allocated for use by computer 110-1 to store the journal information. Other journal data regions 175 in storage area 160 of the shared storage system 180 can be allocated for use by other computers 110 to store their corresponding journals. Thus, a first portion (e.g., journals region 170-2) of the shared storage system 180 may be allocated for storing journal data while other portions (e.g., data region 170-1) of the shared storage system 180 can be allocated for storing application data, metadata, etc.

In step 1150, after successfully flushing contents of the journal space 230-1 to the shared storage system 180, computer 110-1 initiates storage of the file system metadata in metadata cache 225-1, including any modifications (e.g., the change), to the shared storage system 180. Thus, in order to flush contents of the metadata cache 225-1 including any modifications, computer 110-1 stores the journal entries in journal space 230-1 to the shared storage device 180 and then proceeds to flush the modified data in cache to the shared storage system 180. Replaying the journal (or portion thereof) in journal data region 175-1 can be useful when computer 110-1 experiences a crash when attempting flush contents of the metadata cache 225-1 to the shared storage device 180.

One embodiment of the invention involves maintaining respective journals associated with each of the multiple computers 110 having access to the shared storage system 180. The respective journals include journal entries 280 identifying operational steps associated with changes initiated by the multiple computers 110 to different regions of the shared storage 180 at different times. In the event that one of multiple computers 110 competing for access to the shared storage system 180 detects a failure associated with, for example, the computer 110-1, the healthy computer detecting the failure may utilize the journal of computer 110-1 stored in the shared storage system 180 as well as at least one of the respective journals of a non-failing computer to fix corrupted data. For example, a remaining one or more healthy computers generates a map identifying which non-overlapping regions (range of locations) in the shared storage system 180 need to be modified by replaying portions of the journal associated with the failed computer 110-1.

Figure 13:
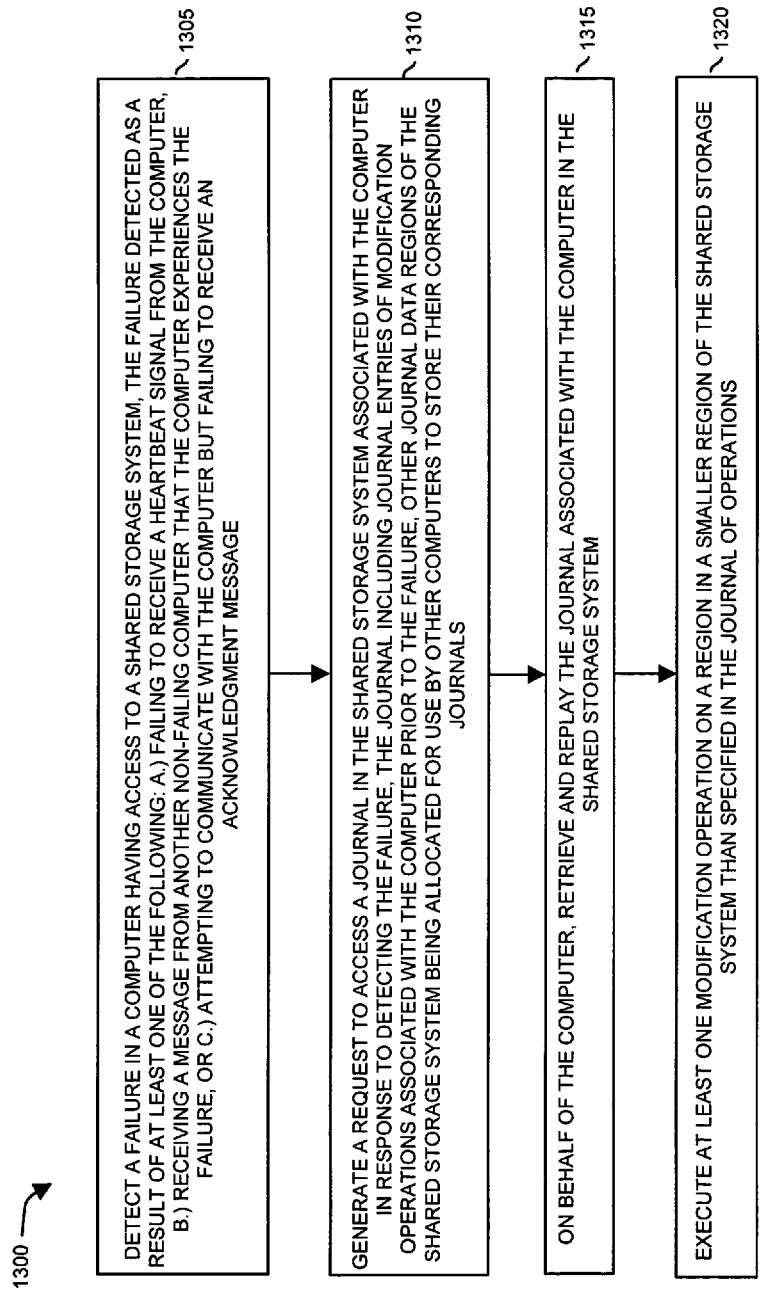
FIG. 13 is a flowchart illustrating a technique of repairing potentially corrupted data resulting from a computer crash according to an embodiment of the invention.

FIG. 13 is a flow chart 1300 illustrating a technique of repairing metadata in shared storage system 180 according to an embodiment of the invention. Assume in this example that computer 110-1 is the crashed or failed computer.

In step 1305, a healthy computer (e.g., a non-failing computer) in cluster 145 detects a failure in computer 110-1 having access to the shared storage system 180. The failure can be detected as a result of at least one of: a.) failing to receive a heartbeat signal from computer 110-1, b.) receiving a message from another non-failing computer in cluster 145 that computer 110-1 experiences the failure, and/or c.) attempting to communicate with the computer 110-1 but failing to receive an acknowledgment message in return.

In step 1310, in response to detecting the failing computer 110-1, the healthy computer in cluster 145 generates a request to access a journal in the shared storage system 180 associated with the failing computer 110-1. As discussed, the journal includes journal entries of modification operations associated with the failing computer 110-1 prior to the failure. In one embodiment, the failing computer 110-1 generates the request to access a specific journal data region 175-1 in the shared storage system 180 allocated for use by the computer 110-1 to store the journal, other journal data regions 175 of the shared storage system 180 being allocated for use by other computers 110 to store their corresponding journals. In one embodiment, the healthy computer in cluster 145 scans all the journals of offline computers, not only the journal of computer 110-1 to prevent corruption of storage system 180.

In step 1315, on behalf of the failing computer 110-1, the healthy computer retrieves and replays the journal in journal data region 175-1 associated with the computer 110-1 in the shared storage system 180. There might be more than one failing computers 110 in which case All of their corresponding journals are replayed together.

In step 1320, the healthy computer replaying the journal executes (note that there is a possibility that no journals are replayed) modification operation in a smaller region of the shared storage system than specified in the journal of operations. In other words, the healthy computer repairs locations in the shared storage system 180 in accordance with the technique shown in FIG. 7. As discussed, techniques of the invention are well suited for use in applications in which multiple computers 110 compete for access to similar locations of a shared storage system 180. However, it should be noted that embodiments of the invention are not limited to use in such applications and thus embodiments of the invention are well suited for other applications as well. For example, techniques of the present invention are not limited to generating and storing journals associated with locally modified metadata retrieved from a shared storage system. They apply to any type of data as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A method for use in a shared storage system, the method comprising:

detecting a change to file system metadata stored in a first computer of multiple computers having access to the shared storage system;

creating a journal, the journal identifying executed operational steps used to change the file system metadata stored in the first computer;

storing the journal to the shared storage system, storage of the journal enabling a second computer to subsequently retrieve and execute at least portions of the journal to carry out the executed operational steps to modify the file system metadata of the shared storage system in accordance with a failed attempt by the first computer to change a copy of the file system metadata in the shared storage system;

maintaining access right schedule information, the access right schedule information identifying which of the multiple computers had access to different regions of the shared storage at different times; and storing at least a portion of the access right schedule information to the journal.

2. A method as in claim 1 further comprising:

retrieving the file system metadata as well as corresponding application data from the shared storage system;

storing the retrieved file system metadata as well as the corresponding application data in the first computer; and initiating the change to the retrieved file system metadata stored in the first computer in response to modifying the corresponding application data stored in the first computer.

3. A method as in claim 1, wherein storing the journal includes:

storing the journal to the shared storage system before storing of changed file system metadata to the shared storage.

4. A method as in claim 3 further comprising:

after storing the journal to the shared storage system, initiating storage of the file system metadata including the change to the shared storage system.

5. A method as in claim 1, wherein storing the journal includes:

storing the journal to a specific journal data region in the shared storage system allocated for use by the first computer to store the journal, other journal data regions of the shared storage system being allocated for use by other computers to store their corresponding journals.

6. A method as in claim 1, wherein creating a journal in the first computer includes:

generating a journal entry for the journal, the journal entry including a set of executable operational steps that are performed to recreate the change to the file system metadata in the first computer, wherein the operational steps are i) atomic and ii) idempotent.

7. A method as in claim 1 further comprising:

generating time stamps for corresponding journal entries stored in the journal, the time stamps indicating a relative time when the first computer makes a corresponding change to the file system metadata in the first computer.

8. A method as in claim 1, further comprising:

maintaining respective journals associated with the multiple computers having access to the shared storage system, the respective journals indicating operational steps associated with changes initiated by the multiple computers to different regions of the shared storage at different times;

detecting a failure in the first computer; and utilizing the journal of the first computer stored in the shared storage system as well as all of the respective journals of other offline computers and the access schedule information of all online computers to generate a map identifying which non-overlapping regions in the shared storage system need to be modified by replaying portions of the journal associated with the first computer.

9. A method as in claim 1 further comprising:

detecting a failure in the first computer;

generating a request to access a journal in the shared storage system associated with the first computer in response to detecting the failure, the journal including journal entries of modification operations associated with the first computer prior to the failure; and on behalf of the first computer, retrieving and replaying at least portions of the journal associated with the first computer in the shared storage system.

10. A method as in claim 1 further comprising:

via communications from the first computer, negotiating with the multiple computers to obtain access rights to a specific region of the shared storage system being accessed by the first computer.

11. A computer system for reducing data corruption in a shared storage system, the computer system comprising:

a processor;

a memory unit that stores instructions associated with an application executed by the processor;

a communication interface that supports communication with other nodes of the storage area network; and an interconnect coupling the processor, the memory unit, and the communication interface, enabling the computer system to execute the application and perform operations of:

detecting a change to file system metadata initiated by a first computer of multiple computers having access to the shared storage system;

creating a journal, the journal identifying operational steps associated with the change to the file system metadata;

storing the journal to the shared storage system, storage of the journal enabling a second computer to subsequently retrieve and execute at least portions of the journal to carry out the executed operational steps to modify the file system metadata of the shared storage system in accordance with a failed attempt by the first computer to change a copy of the file system metadata in the shared storage system;

maintaining access right schedule information, the access right schedule information identifying which of the multiple computers had access to different regions of the shared storage at different times; and storing at least a portion of the access right schedule information to the journal.

12. A computer system as in claim 11 that additionally performs operations of:

retrieving the file system metadata from the shared storage system;

storing the retrieved file system metadata in the first computer; and initiating the change to the retrieved file system metadata stored in the first computer.

13. A computer system as in claim 11, wherein storing the journal includes:

storing the journal to the shared storage system is done before the storing of the changed file system metadata to the shared storage.

14. A computer system as in claim 13 that additionally performs operations of:

after storing the journal to the shared storage system, initiating storage of the file system metadata including the change to the shared storage system.

15. A computer system as in claim 11, wherein storing the journal includes:

storing the journal to a specific journal data region in the shared storage system allocated for use by the first computer to store the journal, other journal data regions of the shared storage system being allocated for use by other computers to store their corresponding journals.

16. A computer system as in claim 11, wherein creating a journal in the first computer includes:

generating a journal entry for the journal, the journal entry including a set of executable operational steps that may be performed by to recreate the change to the file system metadata in the first computer, wherein the operational steps are i) atomic and ii) idempotent.

17. A computer system as in claim 11 that additionally performs operations of:

generating time stamps for corresponding journal entries stored in the journal, the time stamps indicating a relative time when the first computer makes a corresponding change to the file system metadata in the first computer.

18. A computer system as in claim 11 that additionally performs operations of:

maintaining respective journals associated with the multiple computers having access to the shared storage system, the respective journals indicating operational steps associated with changes initiated by the multiple computers to different regions of the shared storage at different times;

detecting a failure in the first computer; and utilizing the journal of the first computer stored in the shared storage system as well as all of the respective journals of other offline computers and the access schedule information of all online computers to generate a map identifying which non-overlapping regions in the shared storage system need to be modified by replaying portions of the journal associated with the first computer.

19. A computer system as in claim 11 that additionally performs operations of:

detecting a failure in the first computer;

generating a request to access a journal in the shared storage system associated with the first computer in response to detecting the failure, the journal including journal entries of modification operations associated with the first computer prior to the failure; and on behalf of the first computer, retrieving and replaying at least portions of the journal associated with the first computer in the shared storage system.

20. A computer system as in claim 11 that additionally performs operations of:

negotiating with the multiple computers for access rights to a specific region of the shared storage system.

21. A computer program product including a computer-storage medium having instructions stored thereon for processing data information, such that the instructions, when carried out by a processing device, enable the processing device to perform the steps of:

detecting a change to file system metadata stored in a first computer of multiple computers having access to a shared storage system;

creating a journal, the journal identifying operational steps associated with the change to the file system metadata;

storing the journal to the shared storage system, storage of the journal enabling a second computer to subsequently retrieve and execute at least portions of the journal to carry out the executed operational steps to modify the file system metadata of the shared storage system in accordance with a failed attempt by the first computer to change a copy of the file system metadata in the shared storage system;

maintaining access right schedule information, the access right schedule information identifying which of the multiple computers had access to different regions of the shared storage at different times; and storing at least a portion of the access right schedule information to the journal.

22. A computer system having access to a shared storage system, the computer system including a processor coupled to a memory, and the computer system including:

means for detecting a change to file system metadata stored in a first computer of multiple computers having access to the shared storage system;

means for creating a journal, the journal identifying operational steps associated with the change to the file system metadata; and means for storing the journal to the shared storage system, storage of the journal enabling a second computer to subsequently retrieve and execute at least portions of the journal to carry out the executed operational steps to modify the file system metadata of the shared storage system in accordance with a failed attempt by the first computer to change a copy of the file system metadata in the shared storage system;

means for maintaining access right schedule information, the access right schedule information identifying which of the multiple computers had access to different regions of the shared storage at different times; and means for storing at least a portion of the access right schedule information to the journal.

23. A method as in claim 10, wherein storing at least a portion of the access right schedule information to the journal includes storing timing information indicating when the first computer initiated the change to the file system metadata stored in the first computer relative to a second computer attempting a modification of a copy of the file system metadata at the second computer.

* * * * *